(12) United States Patent
McAlister

(10) Patent No.: US 11,514,396 B2
(45) Date of Patent: Nov. 29, 2022

(54) SYSTEM AND METHOD FOR DETERMINING A TRANSIT PREDICTION MODEL

(71) Applicant: Simpler Postage, Inc., San Francisco, CA (US)

(72) Inventor: Graham McAlister, San Francisco, CA (US)

(73) Assignee: Simpler Postage, Inc., San Francisco, CA (US)

( * ) Notice: Subject to any disclaimer, the term of this patent is extended or adjusted under 35 U.S.C. 154(b) by 0 days.

(21) Appl. No.: 17/553,416

(22) Filed: Dec. 16, 2021

(65) Prior Publication Data

US 2022/0164676 A1 May 26, 2022

Related U.S. Application Data

(63) Continuation-in-part of application No. 17/070,812, filed on Oct. 14, 2020.

(51) Int. Cl.
*G06Q 10/08* (2012.01)
*G06N 5/02* (2006.01)

(52) U.S. Cl.
CPC ........... *G06Q 10/0838* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,963,861 B1 | 11/2005 | Boucher et al. | |
| 8,407,154 B1 | 3/2013 | Fallows | |
| 10,163,119 B1 | 12/2018 | Bolton et al. | |
| 11,144,868 B1 | 10/2021 | McBride et al. | |
| 2002/0095347 A1 | 7/2002 | Cummiskey | |
| 2003/0233289 A1 | 12/2003 | Yang et al. | |
| 2006/0224398 A1 | 10/2006 | Lakshman et al. | |
| 2007/0208585 A1 | 9/2007 | Bernhard et al. | |
| 2009/0037203 A1 | 2/2009 | Gallagher et al. | |
| 2010/0125494 A1 | 5/2010 | Boss et al. | |
| 2010/0274609 A1 | 10/2010 | Shoemaker et al. | |
| 2010/0312593 A1 | 12/2010 | Johnston et al. | |
| 2011/0047000 A1 | 2/2011 | Perry | |
| 2012/0136571 A1* | 5/2012 | Simon | G06Q 10/02 701/465 |
| 2014/0330741 A1* | 11/2014 | Bialynicka-Birula | G06Q 10/0838 705/341 |
| 2017/0154347 A1 | 6/2017 | Bateman | |

(Continued)

FOREIGN PATENT DOCUMENTS

WO   2018237012 A1   12/2018

OTHER PUBLICATIONS

Nagesh Singh Chauhan, Model Evaluation Metrics in Machine Learning, KDnuggets, (May 28, 2020) (Year: 2020).*

(Continued)

*Primary Examiner* — Emmett K. Walsh

(74) *Attorney, Agent, or Firm* — Jeffrey Schox; Diana Lin

(57) ABSTRACT

A method for prediction model determination can include: determining a set of models, training each model, determining package transit data, evaluating the set of models, selecting a model from the set of models, predicting package transit data using the selected model, and/or any other suitable element.

18 Claims, 18 Drawing Sheets

(56) References Cited

U.S. PATENT DOCUMENTS

| | | | |
|---|---|---|---|
| 2020/0143319 A1* | 5/2020 | Fu | G06Q 10/0838 705/338 |
| 2020/0342398 A1* | 10/2020 | Aggarwal | G06N 20/20 |
| 2021/0090010 A1* | 3/2021 | Cui | G06Q 10/0838 |
| 2021/0365883 A1* | 11/2021 | Marbut, Jr. | G06Q 10/087 |

OTHER PUBLICATIONS

Alice Zheng, Evaluating Machine Learning Models: A beginner's guide to key concepts and pitfalls, O'Reilly, (Oct. 21, 2015) (Year: 2015).*

40. Gustaf Engelbrektsson, Forecasting Future Delivery Orders to Support Vehicle Routing and Selection, KTH Royal Institute of Technology School of Electrical Engineering and Computer Science, Oct. 4, 2018 (Year: 2018).*

41. Or Herman-Saffar, Delivery Date Estimation: Technical challenges you can face when dealing with time-related and dynamically changing environments, Towards Data Science, (Sep. 10, 2019) (Year: 2019).*

Jonquais et al., "Predicting Shipping Time with Machine Learning", available at: https://dspace.mit.edu/bitstream/handle/1721.1/121280/Jonquais_Krempl_2019.pdf?sequence=1&isAllowed=y, last accessed Aug. 9, 2022 (Year: 2019).*

Antoine Charles Jean Jonquais, "Predicting Shipping Time with Machine Learning" Program in Supply Chain Management in Partial Fulfillment of the Requirements for the Degree of Master of Applied Science in Supply Chain Management, May 10, 2019.

Integrating Shipment Tracking: shipping APIs and EDIs from Major Carriers and Aggragators, published by altexsoft.com, on Jun. 11, 2020, all pages (Year: 2020).

\* cited by examiner

SYSTEM AND METHOD FOR DETERMINING A TRANSIT PREDICTION MODEL

CROSS-REFERENCE TO RELATED APPLICATIONS

This application is a continuation in part of U.S. patent application Ser. No. 17/070,812, filed on 14 Oct. 2020, each of which is incorporated in its entirety by this reference.

TECHNICAL FIELD

This invention relates generally to the logistics modeling and prediction field, and more specifically to a new and useful prediction model determination method in the logistics modeling and prediction field.

BRIEF DESCRIPTION OF THE FIGURES

FIG. 3A depicts illustrative examples of evaluation periods.

FIG. 3B depicts illustrative examples of prediction periods.

FIG. 4 depicts illustrative examples of model training periods.

DETAILED DESCRIPTION

The following description of the embodiments of the invention is not intended to limit the invention to these embodiments, but rather to enable any person skilled in the art to make and use this invention.

1. Overview

Figure 1:
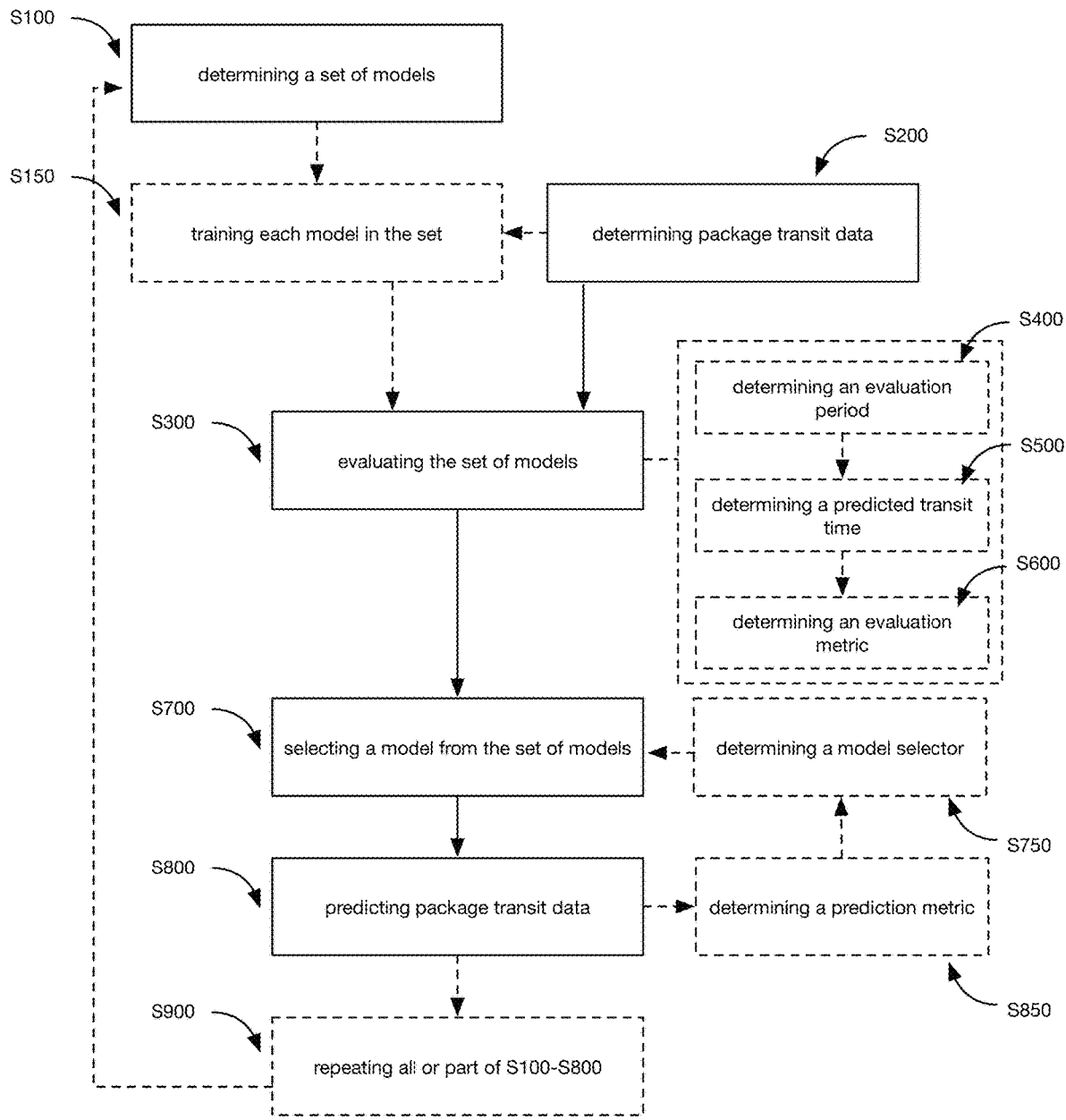
FIG. 1 is a schematic representation of a variant of the method.

As shown in FIG. 1, the transit prediction model determination method can include: determining a set of models S100, training each model S150, determining package transit data S200, evaluating the set of models S300, selecting a model from the set of models S700, predicting package transit data S800 and/or any other suitable element.

In variants, the method can function to determine, select, and/or train one or more models to predict package transit (e.g., physical package delivery to a destination).

2. Examples

In a first example, the method includes: training each of a set of models; and, for each prediction period: selecting a model from the set of models (e.g., selecting a different model for each prediction period) and predicting a transit time and/or delivery date for each package within the prediction period using the selected model. Each model can be retrained each prediction period (e.g., each model's training data can be pulled from a training period that slides with the prediction period).

In a second example, the method includes: for each of a set of rules: determining an evaluation period based on a prediction period and an evaluation window for the rule; for each of a set of models, determining a training period for one or more packages within (e.g., delivered within) the rule's evaluation period and training the model based on the model's training period(s); generating a prediction for each package within the rule's evaluation period using the trained models; generating an evaluation metric for each model based on the predictions; and selecting a model based on the respective evaluation metric using the rule; wherein a rule is then selected from the rule set based on the prediction metrics for the models that the rule selects for the prediction period. The rule is then used to select models for other prediction periods.

3. Technical Advantages

Variants of the technology can confer one or more advantages over conventional technologies.

First, variants of the technology provide significant improvements to the shipping field and/or transit prediction field by reducing the amount of training data, model complexity, and/or computational resources needed to predict a time in transit. The highly irregular and contextually-dependent nature of shipping would require a large amount of training data to capture multiple seasons and/or an extremely complex model to accurately respond to the wide variety of shipping fluctuations and/or irregularities that occur throughout the year. However, by iteratively reselecting a model from a set of trained models, the method can produce accurate predictions faster, with a simpler model, with reduced computational load, and/or with a more efficient model training (and inference) process.

Second, variants of the technology can enable more accurate shipping transit predictions by using one or more models that account for: season; recent, current, and/or predicted shipping behavior; shipping carrier, shipping carrier service, and/or shipping lane; weather; and/or any other factors. In an example, for a given prediction period, a model can be selected and/or trained to best match that prediction period, best match an evaluation period associated with the prediction period, and/or best match any factors relevant to one or more packages shipped during that prediction period.

Third, variants of the technology can provide a robust framework that can accommodate a wide range of shipping conditions. In an example, this framework includes a diversity of models and/or one or more model selection methods.

The models can be trained based on different data sets (e.g., packages associated with different sets of dates), have differing architecture (e.g., algorithms, machine learning models, neural networks (NNs), statistical distributions, etc.), and/or provide any other forms of model diversity. In a specific example, this framework can be used across an entire year, enabling adaptation without requiring method and/or system overhauls when shipping conditions change.

Fourth, variants of the technology can quickly respond to changing shipping conditions. In a first example, model reselection can occur frequently (e.g., each day, each week, each month, for a nonconsecutive window, for a set of packages, etc.) such that the newly selected model is more suited for an upcoming or ongoing package shipment, wherein the previous and new models are each associated with different evaluation windows (e.g., the models are selected using different evaluation windows). This model reselection can enable a quick response to changing conditions despite a lack of real-time prediction feedback due to the long lag in determining an actual delivery time after a prediction has been made. In a second example, a new prediction model can be selected in response to changing contextual parameters (e.g., weather, logistic parameters, dock throughput, shipping carrier information, strikes, etc.). In this example, the model reselection trigger can be based on contextual parameters associated with a training window for the previous prediction model (e.g., a comparison between the updated contextual parameters and the training window parameters).

Fifth, variants of the technology can automatically determine training data for one or more prediction models. In a first example, a training data set is automatically selected such that a statistically significant analysis can be applied to the set. In a first example, the level of shipping lane granularity for the data set can be selected to provide the highest specificity while maintaining statistical significance in the training data. In a second example, the training data can be automatically adjusted (e.g., by shifting a sliding window) based on a shipment creation date. In a third example, bidirectional data for the shipping lane (e.g., from the origin to the destination and vice versa) can be aggregated and collectively used to train the model. In a fourth example, data from multiple carriers can be converted to a common format, such that the cross-carrier data can be aggregated to obtain statistically significant data. However, training data can be otherwise determined.

Sixth, variants of the method can leverage humans in the loop for the model selection and/or model prediction. This human input can be particularly useful when current shipping conditions are highly irregular and/or not reflected in previous shipment data (e.g., when the model prediction error exceeds a threshold).

However, further advantages can be provided by the system and method disclosed herein.

4. System

Figure 2:
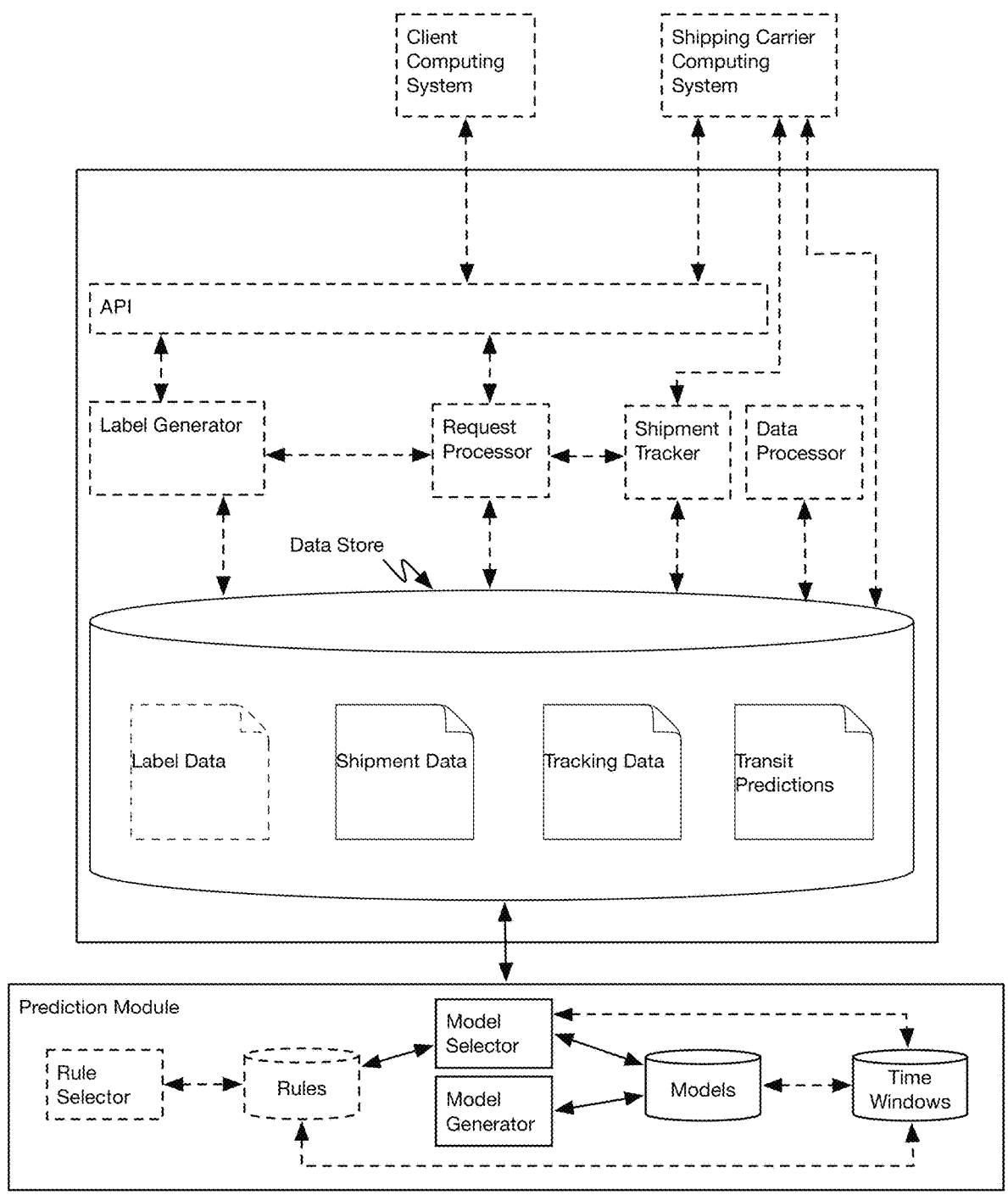
FIG. 2 is a schematic representation of a variant of the system.

The system can be a local (e.g., on-premises) system, a cloud-based system, and/or any combination of local and cloud-based systems. The system can be a single-tenant system, a multi-tenant system, or a combination of single-tenant and multi-tenant components. In variants, the system can include a shipping services platform and/or a prediction module (e.g., example shown in FIG. 2). In examples, the system can include all or portions of the methods described in U.S. application Ser. No. 17/169,348, filed 5 Feb. 2021, which is incorporated in its entirety by this reference. Additionally or alternatively, the system can include different components.

The system can include a data store which can function to store: transit data, shipping label data, models, model selectors, and/or any other data. Any of the information in the data store can be associated with one or more time periods (e.g., prediction periods, evaluation periods, training periods, reference time periods, etc.), time windows (e.g., prediction windows, evaluation windows, training windows, etc.), shipping carriers (e.g., United States Postal Service, Federal Express, United Parcel Service, etc.), shipping carrier services (e.g., United States Postal Service First Class, United States Postal Service Priority Mail, etc.), shipping lanes, and/or any other information.

Transit data for one or more packages (e.g., a single package, each package in a set, an aggregated set of packages, a shipment, etc.) can include shipment data, tracking data, transit time (e.g., number of days in transit, number of business days in transit, time in transit, etc.), transit predictions (e.g., where the prediction can be for any transit data), and/or any other data. Shipment data can include: package shipment creation date, shipment receipt date (e.g., date the package was received at the shipping facility), shipment delivery date (e.g., including whether the package is still in transit), throughput and/or processing times of shipping carrier facilities, contextual parameters (e.g., day of the week, day of the year, week of the year, month, weather, logistic parameters, dock throughput, shipping carrier information, etc.), shipping carrier, shipping carrier service, shipping lane, shipping lane direction, origin location (e.g., address, zip code, etc.), destination location, zone, package size and/or dimensions, package weight, and/or any other package feature and/or shipment parameter. Tracking data can include: a shipping status (e.g., in transit, delivered, etc.); a message from the carrier; a location (e.g., city, state, country, and zip information about the location); a shipping carrier identifier; a service type; a container type; an estimated delivery date; an estimated delivery time; a date a shipment was picked up for delivery; a date a shipment was delivered to a final destination; origin address information; destination address information; a shipment identifier; scan event information (e.g., description, location, time, source, etc. of one or more scan events); a total time in transit (e.g., duration between creation and delivery, duration between departure from a facility and delivery, etc.); and/or any other suitable data. A package can be a parcel, shipment, physical package, data package, and/or any other sent item. A shipment can be a package, a shipment of a package (e.g., where the shipment creation date can be the date the associated package was processed for shipping, the time of invoicing for shipping of a package, etc.), a data object representative of the shipping information for shipping a package (e.g., a physical package), a shipping label for the package, and/or otherwise defined. The package can be actual, hypothetical, computer generated, and/or otherwise created.

In variants, transit data can be augmented with additional data (e.g., from one or more third party data sources). This additional data can include weather data, traffic data, news data, social media data, holiday schedule, tracking data, and/or any other relevant data.

Shipping lanes can be defined at various levels of granularity. At a first level of granularity, a shipping lane is defined as a pair of origin and destination locations (e.g., universal location description, carrier-specific location description, etc.). At a second level of granularity, a shipping lane is defined as a pair of an origin partial address (e.g., partial zip code, full zip code, etc.) and a destination location. At a third level of granularity, a shipping lane is defined as a pair of an origin partial address (e.g., partial zip code, full zip code, etc.) and a destination partial address. Any level of granularity can be further defined by and/or associated with a zone (e.g., where the zone can represent an approximate distance between the origin and destination locations). In some implementations, since shipping lanes defined at a coarser level of granularity encompass several unique addresses, the system is likely to store more data sets for coarsely defined shipping lanes (e.g., shipping lanes in which origin and destination are identified by partial zip codes) as compared to more finely defined shipping lanes (e.g., shipping lanes in which origin and destination are identified by full zip codes). The origin and destination can be defined at the same or different levels of granularity (e.g., the origin defined at zip+4 and the destination defined as a full address).

Transit data can optionally be segmented by any shipment data (e.g., segmented based on shipping carrier service, shipping lane, route, etc.). Additionally or alternatively, transit data can optionally be aggregated across any shipment data (e.g., aggregated across both directions of a shipping lane). In variants, a data aggregation rule is defined for one or more levels of granularity, and transit data can be aggregated in accordance with the aggregation rule.

In an example of an aggregation rule, data for historical shipment data records matching either direction of a shipping lane is aggregated. In such an example, a shipping line is defined by a first and second endpoint. Each endpoint can be identified by a full address or a partial address. In such an aggregation rule, data for historical shipment data records having an origin that matches the first endpoint and a destination that matches the second endpoint destination are aggregated, along with data for historical shipment data records having an origin that matches the second endpoint and a destination that matches the first endpoint.

By aggregating data for historical shipment data records matching either direction of a shipping lane, statistically significant time-in-transit data can be generated for a shipping lane that would not otherwise have statistically significant data if shipments in only one direction were aggregated. This technique of aggregating shipment data for a shipping lane regardless of direction can be used to generate statistically significant time-in-transit data for shipping lanes defined at a finer level of granularity than would be possible if shipments in only one direction were aggregated. For example, if there are only 400 shipments from 94404 to 07081 for USPS First Class Mail, and the shipment threshold requirement amount is 500 shipments, then time-in-transit data generated from those 400 shipments is not likely to be statistically significant. However, if there are 125 shipments from 07081 to 94404 for USPS First Class Mail, then the total number of shipments for the two-way pair is 525, which is greater than the shipment threshold requirement amount. Thus, time-in-transit data generated from those 525 shipments is likely to be statistically significant. In this manner, statistically significant time-in-transit data can be generated for shipping lanes identified zip5-zip5 pairs.

However, data for historical shipment data records can be aggregated in any suitable manner and in accordance with any suitable process or rule.

Figure 3A:
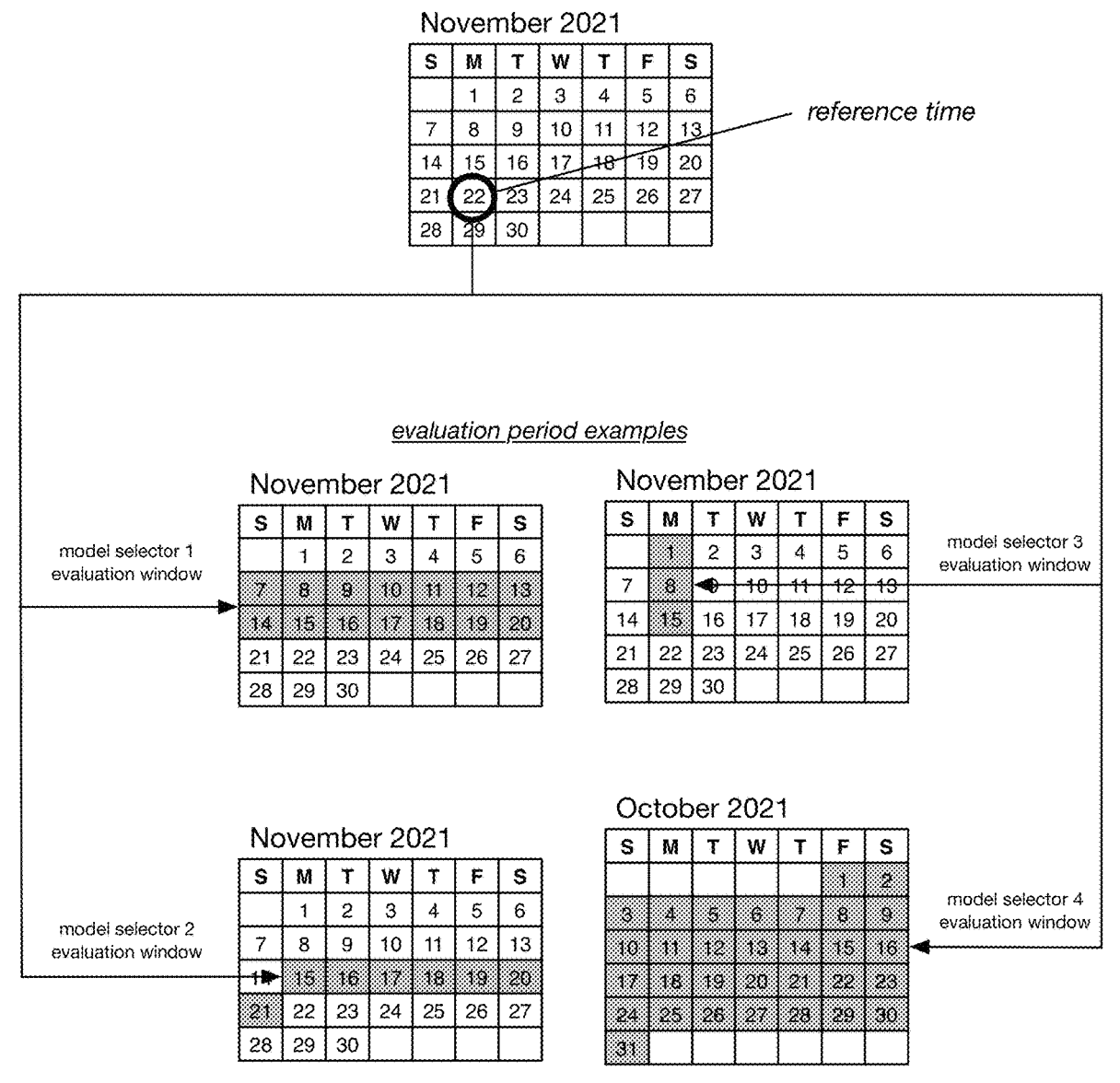
Figure 3B:
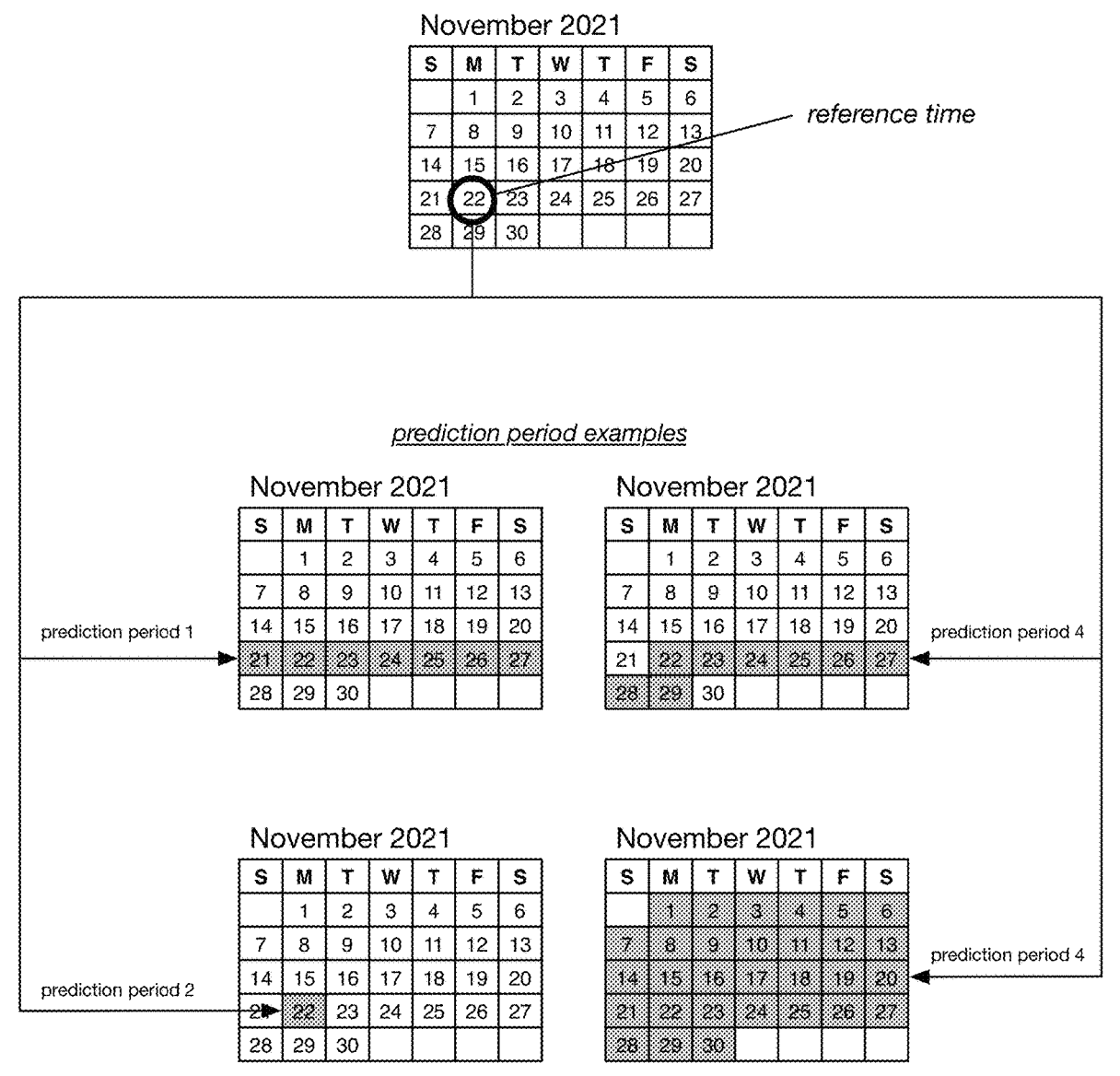
Figure 4:
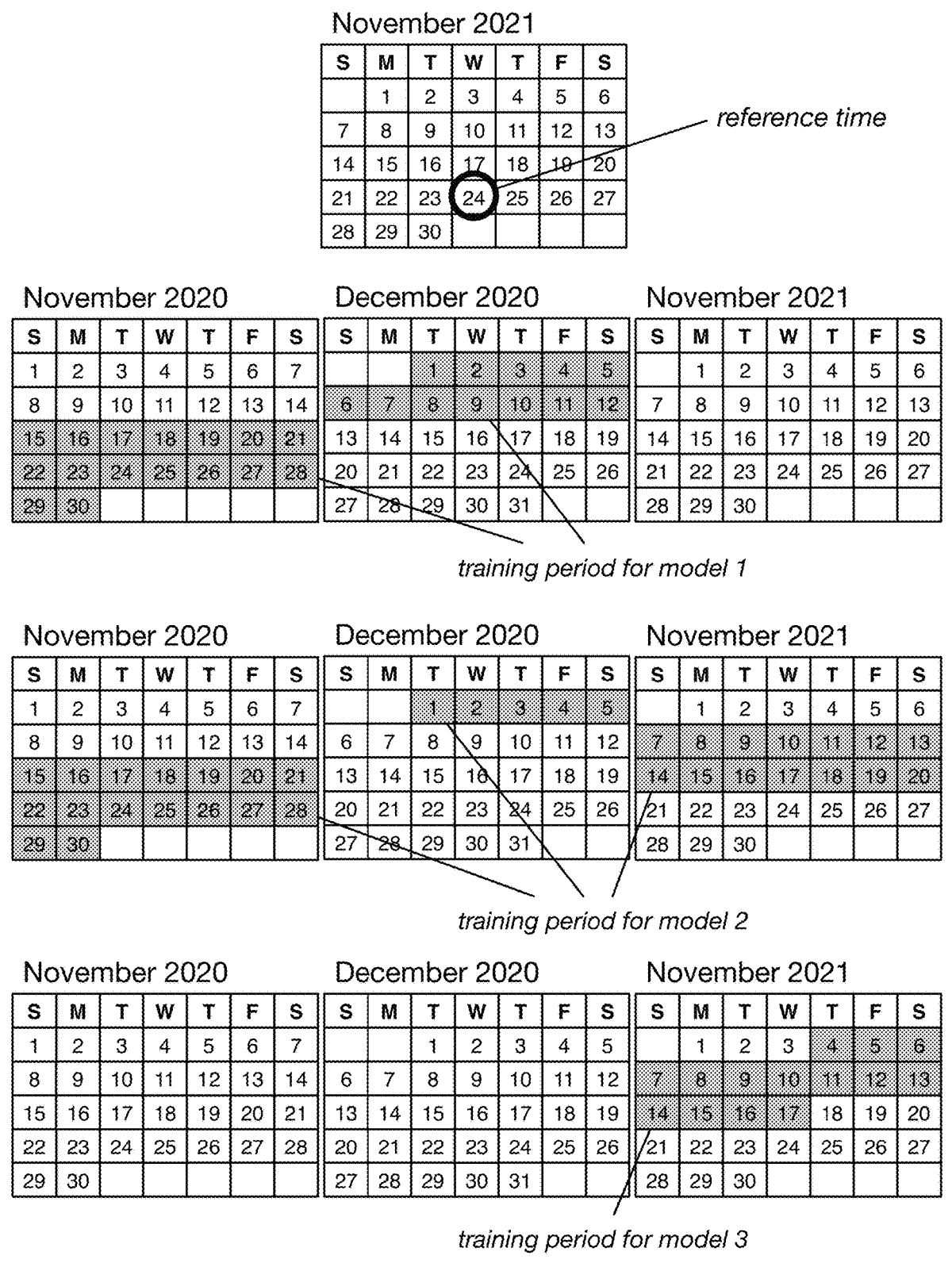

The method can be used with time windows and time periods. A time window can be an interval in time relative to (e.g., extending from, centered about, encompassing, etc.) a reference time. A time period can be one or more specific times (e.g., clock time, time in the form of hh:mm:ss, etc.) and/or dates, and can be defined by a time window applied to a specific reference time. A time window can be static (e.g., a time period maintaining the same duration and start date), sliding (e.g., a time period maintaining the same duration with a variable start date), dynamic (e.g., where the time period duration and/or the window configuration can change), and/or be otherwise configured. Time periods and time windows can encompass consecutive and/or nonconsecutive dates. In variants, a time window can be defined by a duration of one or more time periods and/or a relationship to a reference time period. The reference time period can be any time period and/or recurring time period (e.g., day of year, day of week, hour of day, etc.). The reference time period can be associated with: a package (e.g., shipment creation date, shipment date, delivery date, departure date from a shipping facility, arrival date at a shipping facility, etc.); a prediction period, evaluation period, and/or training period (e.g., the start of the period; end of the period, day and/or time within the period, etc.); day of the week; and/or any other time period. The relationship to the reference time period can be a predetermined offset (e.g., number of days, number of business days, time, any time period, etc.) before and/or after the reference time period. Alternatively the reference time period can be a day or other time period associated with the reference time period (e.g., a day within the reference time period, the first Monday of the reference time period, the start of the reference time period, etc.). Illustrative examples of time periods are shown in FIG. 3, FIG. 3A, and FIG. 4.

Figure 5A:
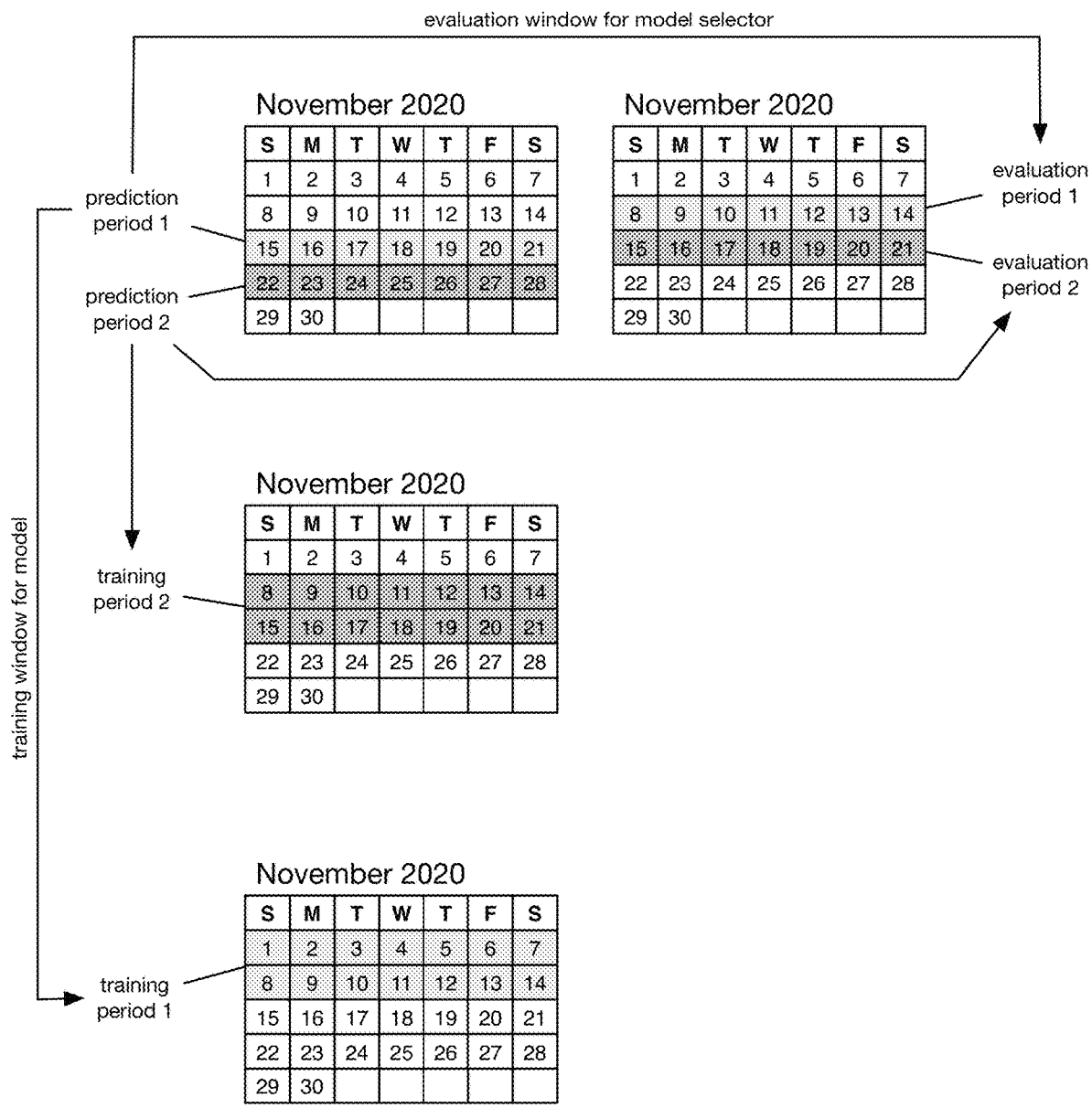
FIG. 5A depicts an example of determining time periods.
Figure 5B:
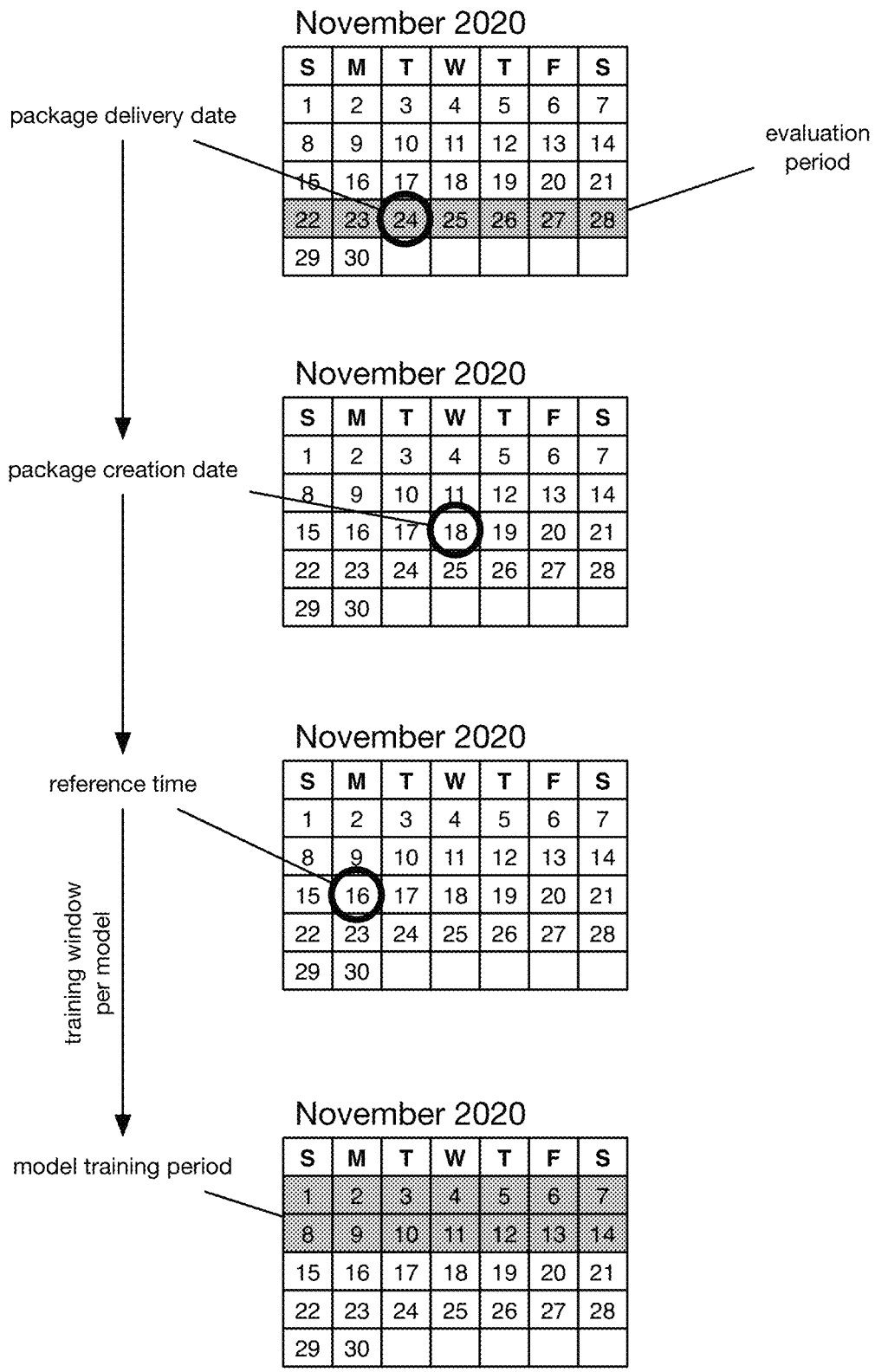
FIG. 5B depicts another example of determining time periods.

In variants, a time period can be a specific instance of a time window (e.g., a specific time period is encompassed by the corresponding time window for a specific reference time period). In a first illustrative example, for a time window corresponding to a 14-day consecutive duration prior to a reference time period, when the reference time period is Jan. 15, 2021, the time window encompasses Jan. 1, 2021 through Jan. 14, 2021, representing a specific time period. In a second illustrative example, for a time window corresponding to the 10 business days prior to a reference time period, when the reference time period is Jan. 18, 2021, the time window encompasses Jan. 4, 2021 through Jan. 8, 2021 and Jan. 11, 2021 through Jan. 15, 2021, representing a specific time period that includes two nonconsecutive time periods. Illustrative examples of determining time periods are shown in FIGURE 5A and FIG. 5B.

In variants, the system includes a model generator which can function to determine and/or train one or more models (e.g., via S100 and/or S150). The model(s) can function to predict transit data (e.g., number of days in transit, business days in transit, delivery forecast, a number and/or percent of packages delivered slower than a prediction, etc.) for one or more packages. Features used by the model to predict the transit data can include a transit date (e.g., including shipment data) associated with a package. The features can be for the package undergoing prediction and/or for packages used in model training and/or model evaluation. A model can be specific to one or more shipping carriers, shipping carrier services, shipment lanes, time periods, time windows, and/or any other shipment information. In an example, a model can be determined and/or trained to predict transit times for packages associated with (e.g., created within, delivered within, etc.) a prediction window.

A model can include or be associated with: a model type, a training window, training method, and/or any other model parameters. The model parameters can be defined by a model specification, or be otherwise defined. Different models can have different model parameters (e.g., where each model in a set of models has a different specification), but alternatively can have overlapping (e.g., partially or entirely overlapping) parameters. In an example, each model in the set is associated with the same model type, but corresponds to different training windows, where the training windows can be overlapping or nonoverlapping.

A model type (e.g., analysis type, prediction algorithm type, etc.) can include: aggregation models, algorithms, statistical algorithms (e.g., $k^{th}$ percentile, nearest-rank method, linear interpolation between closest rank method, weighted percentile method, summary statistics, etc.), regression, logistic regression, neural networks (e.g., DNN, CNN, RNNs, etc.), decision trees, random forests, rules, heuristics, discriminative models (e.g., classifiers), generative models (e.g., naïve bayes, etc.), clustering models (e.g., k-nearest neighbors), an ensemble or cascade thereof, and/or any other model.

A training window can be any time window where data (e.g., transit data) associated with the time window is used to determine and/or train a model. A training period is the time period corresponding to a specific instance of the training window (e.g., relative to a specific reference time period). Illustrative examples of training windows include: the prior 2 weeks, the prior 4 weeks, the prior 2 weeks and the current week in a prior year, the prior week and the current week as well as an upcoming week in the prior year, the current and upcoming week in both the prior year and 2 years ago, the prior October-DEC, every rainy day from the last 4 years, the month of November, days (e.g., within a time period) where more than a threshold number of shipments were late, and/or any other time window. Illustrative examples of reference time periods include: a shipment creation date, the Monday prior to a shipment creation date, a package delivery date, a facility and/or port departure date, a facility and/or port departure arrival date, the first Monday of a time period (e.g., a prediction period, evaluation period, etc.), a holiday, and/or any other reference time period. The duration of the training window is preferably fixed for a model, but alternatively can be adjustable (e.g., based on shipping conditions, the time of year, prediction feedback, user input, the number of packages shipped for a shipper carrier and/or service, etc.). Example training periods for a given reference time are shown in FIG. 4.

In variants, the system includes a model selector which can function to select one or more models from a set of models. The model selector can include or be associated with: a selection methodology, an evaluation window (e.g., including an evaluation window duration and an offset between the window and a reference time period), and/or any other suitable selection parameters. The selection methodology can include: one or more rules (e.g., determined in S750, selected using a rule selector, etc.) that prescribe model selection criteria and/or model selection processes; a classifier (e.g., trained to select the best model); a decision tree; heuristics; and/or any other suitable selection methodology. Different model selectors can have the same or different selection parameters. In variants, the model selector itself can be one of a set of model selectors, wherein the model selector can be selected from the model selector set (e.g., once, periodically, for each prediction period, etc.).

In a first variant, the rule includes a selection criterion applied to a set of evaluation metrics, with one evaluation metric for each model. In a first embodiment, the rule can prescribe model selection based on a model's evaluation metric relative to the other evaluation metrics in the set (e.g., the model is selected when its associated evaluation metric is the: minimum, maximum, median, outlier, any other statistical measure, etc.). In a second embodiment, the rule can include and/or be based on a selection model applied to the evaluation metrics (e.g., a trained selection model). In any variant, the evaluation metrics used for selection can be a subset of a larger evaluation metric set (e.g., where outliers are ignored).

In a second variant, the rule includes a selection criterion applied to a set of evaluation metrics, with multiple evaluation metrics for each model (e.g., one evaluation metric for each evaluation subperiod, as determined in S400). Evaluation metrics can optionally be aggregated (e.g., across subperiods of the evaluation period, across packages, across models, etc.). In a first embodiment, the evaluation metrics are first aggregated into one aggregate evaluation metric for each model, then the rule prescribes model selection based on the aggregate evaluation metrics (e.g., as described in the first variant). The aggregation can be performed for each model across evaluation subperiods (e.g., where aggregation can include: addition, average, median, weighted average, any statistical measure vectorization, vector transformation, application of any algorithm, etc.). Optionally, the aggregation and/or subsequent selection can be applied to a subset of the evaluation metrics (e.g., only negative metrics, positive metrics, non-outlier metrics, outlier metrics, etc.). The evaluation metrics can be additionally or alternatively transformed (e.g., by taking the absolute value of each metric) prior to or post metric aggregation. In a second embodiment, the rule can prescribe the selection of one or more models for each evaluation subperiod, followed by a subsequent selection of the final model based on first round of selections (e.g., where the final model is the model most selected across the evaluation period subperiods). In a third embodiment, the rule can prescribe ranking models for each evaluation subperiod (e.g., based on a selection criteria), followed by a subsequent selection of the final model based on the model rankings (e.g., selecting the model with the highest aggregate ranking, selecting based on any ranked-choice selection system, etc.).

In examples, a rule includes a selection criterion to select the model with the: median negative evaluation metric, minimum evaluation metric, minimum absolute value evaluation metric, maximum evaluation metric, median evaluation metric, minimum evaluation metric for the most number of days, and/or any other selection criteria.

In variants, the system can include a selection interface for a human selection agent. The selection interface can function to enable the human selection agent to select a model, verify a selected model, override a model selection, determine a model prediction period, determine a model, determine a rule, and/or otherwise interface with the prediction module. The selection interface can communicate with the model selector and/or rule selector, be a component of the model selector and/or rule selector, and/or be otherwise configured relative to any other system component.

In variants, the shipping services platform includes an application programming interface (API). In some implementations, the API is a REST API. However, the API can be any suitable type of API that functions to receive requests from systems external to the platform. In variants, the API is a public API that is accessible by computing systems via a public network (e.g., the Internet). In some implementations, the API functions to process API requests for parcel shipping and logistics processing functionality. In variants, the shipping services platform is a multi-carrier, multi-services shipping platform that functions to process API requests for parcel shipping and logistics processing functionality for several shipping carrier services (e.g., several carrier services provided by one or more shipping carriers).

For example, the shipping services platform can generate shipping labels (and optionally tracking information) for any one of a plurality of shipping carriers supported by the shipping services platform. Additionally or alternatively, the shipping services platform can generate shipping labels (and optionally tracking information) for any one of a plurality of services provided by a shipping carrier supported by the shipping services platform.

Applications created by application developers (e.g., running on a client computing system, a shipping carrier computing system, etc.) can interface with the API to perform one or more shipping-related process. Shipping related processes can include one or more of: verifying addresses, purchasing shipping, tracking packages, and insuring shipments. However, any suitable shipping-related process can be performed by using the shipping services platform's API.

In variants, computing systems of shipping carriers can integrate with the shipping services platform via the API. In some implementations, shipping carrier computing systems can access the API to provide one or more of: shipping service information provided by the carrier (e.g., including rates, service levels, etc.), shipping label generation information, tracking information, shipping requirements (including manifest requirements, etc.), or any other suitable carrier-related data.

In variants, access to the API is authenticated by using authentication information that is associated with a platform account (e.g., a parent user account, a child account, etc.). The authentication information can be an API key, or any other suitable type of authentication information. The API can be used to perform configuration for a platform account (e.g., configure a user, configure a shipping carrier account, configure a facility, etc.) or retrieve data stored by the shipping services platform (e.g., information stored for a user, etc.). In variants, authentication information for a platform account can be used to access the API from one or more client devices.

In variants, functionality provided by the shipping services platform can be accessed via a user interface.

In some variations, the system includes a label generator. The label generator functions to generate label data. In some implementations, the label generator generates label data in response to a shipment request received via the API. The label generator generates label data for a selected shipping carrier (e.g., identified by the shipment request, identified by configuration, etc.). The label generator can use information stored in a data store top generate labels. Such information can include one or more of: shipping facility configuration (e.g., address of shipping facility that sends the shipment), shipping sender configuration, and shipping carrier configuration. However, the label generator can use any suitable information to generate a shipping label.

In variants, the label generator generates label data for each generated shipping label and stores the label data at the data store.

In some variations, the system includes a request processor. The request processor functions to process shipment requests. In some implementations, the request processor generates label data in response to a shipment request received via the API.

In some variations, the system includes a data processor. The data processor can function to generate multi-service shipment data by using data accessed from one or more data sources (e.g., tracking data generated by the shipment tracker), and optionally store the shipment data in the data store. Any data (e.g., transit data) can be accessed from the data store, from the shipment tracker, from a shipment carrier computing system, from a publicly available database, from a web site, and/or from any other source. Data can be accessed via a request, an API, and/or any other system.

In some variations, the system includes a shipment tracker that generates tracking data by using data accessed from one or more data sources (e.g., a shipping carrier computing system, etc.), and optionally stores the tracking data in the data store.

In some variations, one or more of the components of the system are implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in hardware device are communicatively coupled via a bus. In some variations, one or more components included in the hardware system are communicatively coupled to an external system via the communication interface.

The communication interface functions to communicate data between the hardware system and another device via a network (e.g., a private network, a public network, the Internet, and the like).

In some variations, the storage device includes the machine-executable instructions for performing at least a portion of the method described herein.

In some variations, the storage device includes the data included in the data store.

The input device can function to receive user input.

Any component of the system (e.g., model selector, model generator, rule selector, model, rule, etc.) can use one or more of: regression, classification, neural networks (e.g., CNNs, DNNs, etc.), rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, statistical methods, deterministics, genetic programs, support vectors, or any other suitable method.

However, the method can be performed with any other suitable system.

5. Method

As shown in FIG. 1, variants of the transit prediction model determination method can include: determining a set of models S100, training each model S150, determining package transit data S200, evaluating the set of models for an evaluation period S300, selecting a model from the set of models S700, predicting package transit data S800, and/or any other suitable element. In variants, the method can function to determine, select, and/or train one or more models for a package transit prediction.

All or portions of the method can be performed at or before the start of a prediction period, during a prediction period, iteratively for each new prediction period (e.g., where the prediction periods can overlap or not overlap), once or multiple times for a given package, once or multiple times across a set of packages (e.g., based on shipment creation date, shipping carrier, shipping carrier service, shipping lane, etc.), after a trigger event (e.g., triggered automatically, by a human, based on feedback from predictions, for predetermined dates, etc.), and/or at any suitable time. All or portions of the method can be performed by one or more components of the system and/or any other suitable system. In examples, the method can include all or portions of the methods described in U.S. application Ser. No. 17/169,348, filed 5 Feb. 2021, which is incorporated in its entirety by this reference.

In variants, the method can use data from one or more carriers (e.g., data from multiple carriers can be converted to a common format, such that the cross-carrier data can be aggregated to obtain statistically significant data), from third-party sources, from the data store, and/or any other data.

In an example, a model is selected from a set of models to provide a transit time prediction for an undelivered package within a prediction window. The prediction window can be a sliding window extending from one or more reference time periods (e.g., the current date; a current, past, and/or future day of the week; any other reference time period). In a specific example, this can include, for each model: predicting transit time(s) for one or more packages in a historical evaluation window, comparing the predicted transit time(s) to actual transit time(s) for said packages, and selecting the most predictive model based on the comparison, wherein the transit times (and/or delivery dates, which can be determined from the respective transit time and the creation or shipping date) for packages in the prediction window are predicted using the selected model. A different model can be selected for each shipping lane, carrier, route, and/or other shipping parameter. The model can be selected using a rule, a machine learning model, a user, and/or any other method. The method can be repeated for multiple successive prediction periods (e.g., where the sliding prediction window is shifted in each case to encompass a new set of dates forming a prediction period), wherein a new model can be selected for each prediction period.

Each model can be specifically trained for a historical evaluation period (e.g., for one or more packages in a historical evaluation period) and/or the selected model can be specifically retrained for a prediction period. The models can be trained based on a model-specific sliding training window, extending from one or more period-specific reference dates (e.g., an evaluation reference time period and a prediction reference time period). When the method is repeated for successive prediction periods, a new historical evaluation period can be determined for each successive prediction period (e.g., by shifting an evaluation window based on a reference time period associated with the prediction period), the models can each be retrained for the new historical evaluation period, and the (newly selected) model can be retrained for the new prediction period.

In variants, the model can be selected from a set of models using a rule, wherein the rule is selected from a set of rules. The rule can be selected once, selected for a given prediction window, and/or be selected for each specific prediction period. Selecting the rule from the set of rules can include, for each rule: selecting a model according to the respective rule (e.g., based on the prediction accuracy of each model), evaluating one or more predictions made by the corresponding selected model (e.g., how well the model predicts transit times for a given set of packages), optionally repeating the model selection and prediction evaluation for multiple prediction periods, and selecting the rule based on the evaluation. In a specific example, the rule which selected the best prediction model for a given prediction period (e.g., retroactively determined based on prediction evaluation data after a plurality of the packages associated with the given prediction period have been delivered) is then used as the model selection rule for a subsequent prediction period.

In an illustrative example, to determine a shipping prediction for a new package, a set of models can be evaluated for selection using a set of packages delivered during an evaluation period (e.g., the prior two weeks). The prediction can be applicable to the single package, any package within a prediction period (e.g., for an upcoming week), and/or any other package. The evaluation period and prediction periods can be determined based on a sliding evaluation window and a sliding prediction window, respectively, where each window encompasses a set of dates relative to a reference time period (e.g., where the same reference time period or different reference time periods can be used to determine the evaluation and prediction periods). Each model in the set can be associated with a different sliding training window relative to one or more reference time periods; in an example, a first model has a sliding training window for the 4 weeks of transit data prior to the reference time period. A shipment creation date for each package delivered within the evaluation period can then be determined and used to determine the reference time(s) for the model training windows (e.g., where the creation date is within a historical prediction period, wherein the historical prediction period has a predetermined reference time). Predicted transit times (e.g., one predicted transit time per model) for each package can then be calculated using each model trained with associated training data based on the respective training windows. For the first model, training data can be retrieved for packages delivered in the prior 4 weeks from the respective reference time periods associated with the shipment creation dates. Comparisons between predicted transit times and actual transit times, when aggregated across the packages in the evaluation period for a given model, can determine an evaluation metric for each model for that evaluation period. Using a rule selection criterion applied to the aggregated metrics per model, one or more models can be selected from the set. The selected model can be used to predict the time in transit for the new shipment (e.g., with a training window relative to a reference time period associated with the creation date for the new shipment).

Determining a set of models S100 can function to prescribe and/or train one or more models to predict package transit data. The set of models can be determined once or multiple times: before the method (e.g., predetermined), for a prediction period, for an evaluation period, for a package (e.g., each package in the prediction period, each package within the evaluation period, etc.), for a date (e.g., a creation date, delivery date, etc.), and/or at any other time.

The set of untrained models, the respective training data, and/or the respective training methodology are preferably predetermined, but can alternatively be randomly determined, learned, or otherwise specified.

Each model is preferably specific to a set of shipping parameters, but can alternatively be generic. Examples of shipping parameters can include: shipping carriers, services, lanes, routes, time periods, conditions (e.g., weather, logistics such as backlog, etc.), and/or other parameters. The models can be made specific to the set of shipping parameters by: training on data having said shipping parameters, by structuring the model architecture for said data, and/or otherwise made specific to the shipping parameter set. In a first variant, one or more models can be determined for a predetermined set of shipping carriers, shipping carrier services, and/or shipping lanes. In a second variant, model(s) can be determined for dynamic shipping lanes. In an example, to determine a model for a prediction period, a shipping lane granularity can be selected to satisfy a given threshold (e.g., a threshold number of packages in the lane matching a shipping carrier and/or shipping carrier service). This dynamic lane selection can be used to select the finest level of granularity that provides statistically significant transit data. In a third variant, model(s) can be determined for a specific recurring time window (e.g., a specific season, specific day of the year, days relative to a holiday, etc.). In a fourth variant, model(s) can be determined for a specific set of shipping conditions (e.g., weather parameter values, logistic parameter values, etc.). In an example, shipping conditions can be retrieved from a third-party database.

Determining the set of models (e.g., the models described for the system) can include determining the model specification (e.g., the model training window). The model specification can be predetermined (e.g., where a set of model specifications are stored in the datastore), manually determined (e.g., via a user input), learned (e.g., through iterative testing, training, etc.), randomly determined, and/or otherwise determined.

Determining the set of models can additionally or alternatively include retrieving pretrained models from a database (e.g., the data store), training one or more models (e.g., S150), and/or otherwise determining the models.

However, the models can be otherwise determined.

Training a model S150 can function to train a model to generate a transit prediction for one or more packages. S150 can be repeated for one or more models in a set of models. The set of models is preferably static, but can alternatively be dynamic (e.g., new models determined for each new prediction period, the model generator is trained to generate new models and/or remove previous models from the set, etc.).

The model can be trained for a shipping lane, carrier, route, set of shipping conditions, and/or other shipping parameter, or be generic. When the model is specific to a shipping parameter, the training data is preferably limited to the shipping parameter (e.g., a shipping lane-specific model is trained only on data from the shipping lane), but can alternatively include training data from other shipping parameter sets. The training data can be determined using S200, or otherwise determined.

The model can be trained based on training data (e.g., historical transit data, synthetic data, etc.). Each model in the set of models is preferably trained on different training data (including overlapping training data), but alternatively can be trained on the same training data. The training data can be transit data determined (e.g., via S200) based on shipment data (e.g., transit data for packages is selected as the training data based on the associated shipment creation date, shipping carrier service, shipping lane, etc.).

The training data is preferably determined based on and/or associated with a time period (e.g., the transit data is used as training data if the shipment creation date and/or delivery date is contained in the time period), but can alternatively not be associated with a specific time period (e.g., the training data can be determined and/or associated with other transit data). The time period can be predetermined for each model, universal across the set of models, different for each model, specific for a given package and/or a set of packages, associated with a reference time period, be associated with a prediction period, and/or otherwise configured. In a first variation, the training data includes data from a time period determined based on the respective training window for a given model. The reference time used for time period calculation can include: the prediction period, the evaluation period, a creation date for a package within the evaluation period, and/or otherwise determined. In a second variation, the training data is static, wherein all models are trained on the same training data. In examples, the same or different training datasets for each package associated with an evaluation period (e.g., evaluation sub-period) can be used across a set of models. However, the training data can be otherwise determined.

Figure 6:
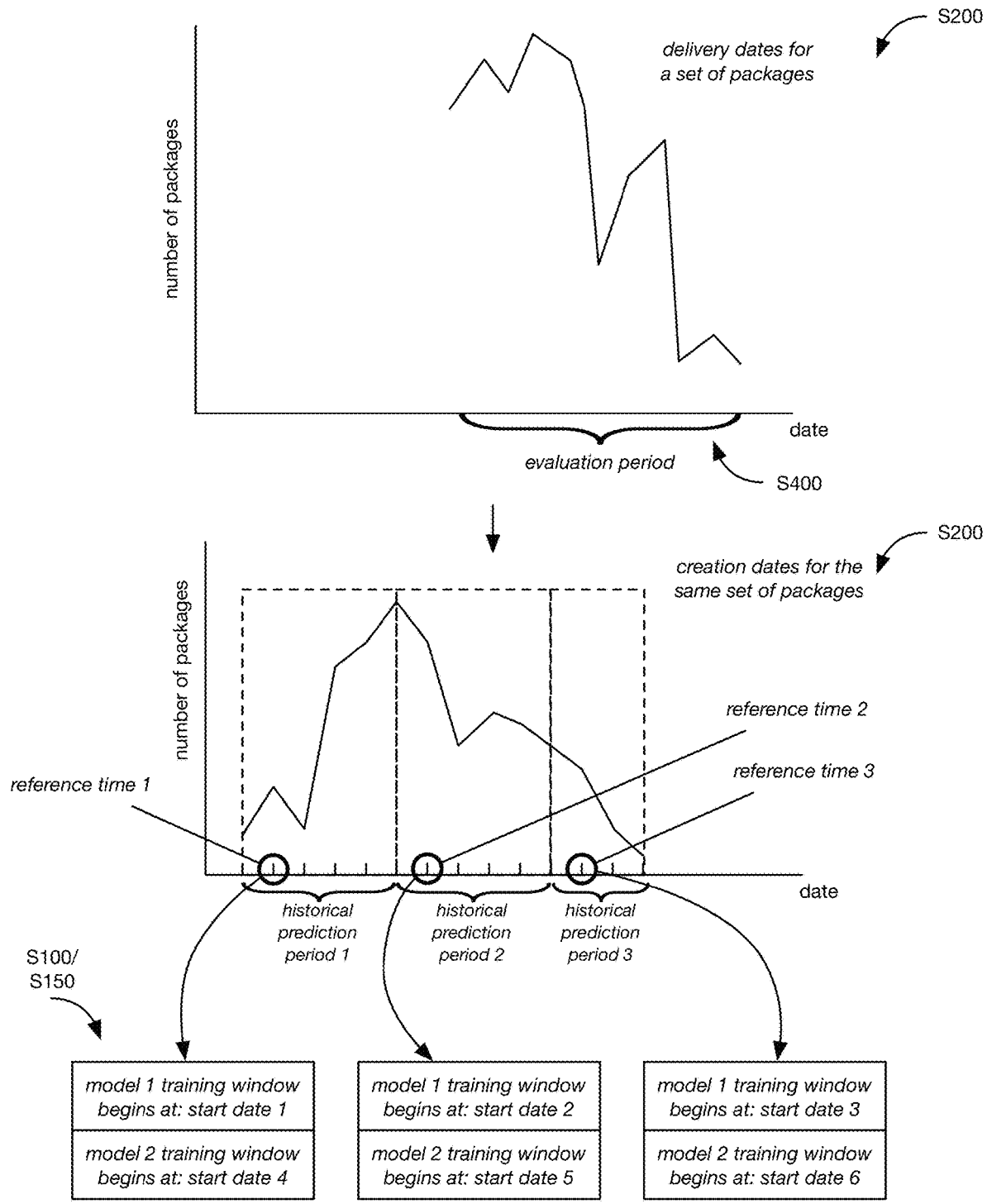
FIG. 6 depicts an illustrative example of model training windows for evaluation period predictions.

The training data for a given model can include: a package's creation date and a package's shipping parameters (e.g., carrier, service, route, lane, etc.), actual transit times (e.g., a difference between a delivery date and a shipment creation date), and/or other information for packages associated with the training period. In an illustrative example, the training data can include a package's creation date and while the training target can be the package delivery date. Packages can be associated with the training period when the package was delivered within the training period (e.g., example shown in FIG. 6), had a shipping label created within the training period, was received within the training period, and/or be otherwise associated with the training period.

In variants, the training data for packages associated with a training period can be weighted based on shipment data, where packages with matching shipment data to the target package undergoing prediction have higher weights. In an example, this weighting enables the inclusion of data with partially overlapping shipment data criteria (e.g., rather than complete overlap) which can expand a training dataset for improved statistics.

However, the training data for a model can be otherwise determined.

Each model is preferably trained using a model-specific training method, but can be otherwise trained. Examples of training methods include: supervised learning, unsupervised learning, distribution generation (e.g., building a model from the time-in-transit distribution for packages within the training period), and/or other training methods.

In a first variant, the model being trained is a machine learning model. In this variant, for a given package, the model can be fed a shipment creation date (and, optionally, other transit data and/or contextual parameters). The model then predicts a transit time and/or a delivery date, which can then be compared against actual transit data, such as the actual transit time or delivery date (e.g., determined via S200). Optionally, this comparison can include determining a prediction metric (e.g., S750) for one or more predictions. The comparison can then be used as feedback to train (e.g., update) the model.

In a second variant, training the model comprises determining a model instance for a given set of training data. The model instance can calculate the transit data prediction from the set of training data. In a first example, the transit data prediction can be a statistical measure (e.g., mean, median, etc.) of the set of training data (e.g., as described in S500 and/or S800). In a second example, the model outputs a transit data prediction for a package based on (e.g., calculated from) transit data associated with: a specific training period (e.g., determined based on the model training window, with the package shipment creation date as the reference time period) and/or shipment data associated with the package (e.g., where training data is selected with matching shipment parameters).

However, the model can be otherwise trained.

In a first illustrative example, a model is retrained for each prediction period, wherein each prediction period is associated with a reference time (e.g., the prediction period's start date, the prediction period's end date, etc.). A training period for the model is determined for each prediction period based on the associated reference time (e.g., according to the model's training window). The model is then iteratively retrained for each new prediction period, based on the new training period determined from the new prediction period's reference time.

In a second illustrative example, a model is retrained for each of a set of historic evaluation periods, wherein each historic evaluation period is associated with a reference time (e.g., evaluation period start, evaluation period end, reference time outside of the evaluation period, etc.). A training period for the model is determined for each evaluation period based on the evaluation period's reference time (e.g., according to the model's training window). Different instances of the model are then trained for each historic evaluation period, based on the training period determined from the respective evaluation period's reference time.

In a third illustrative example, a model is retrained for each unique reference time for packages associated with (e.g., delivered within, created within, etc.) a historic evaluation period. Each unique reference time is associated with a historical prediction period determined (e.g., selected from a series of prediction periods) based on one or more package reference times (e.g., shipment creation dates). For example, if each calendar week represents a prediction period, all packages created within a given week can be associated with a reference time for that week (e.g., where the historical prediction period is the given week). A new training period can then be determined for each unique reference time, wherein the model is trained on transit data associated with the training period. The training period is preferably determined from the historical prediction period's reference time and the model's training window, but can be otherwise determined. In variants, this can create a different trained model instance for each historical prediction period associated with packages within the historic evaluation period. In variants, the reference time for the historical prediction period can be a creation date, resulting in a different trained model instance for each package and/or unique creation date. For example, if N packages were associated with the evaluation period with U unique historical prediction periods (e.g., determined based on the package shipment creation dates), this example would generate U instances of the same model, each trained on a different set of training data (e.g., where each model instance applies to all packages associated with the respective historical prediction period). When the system includes a set of M models, this would generate M*U model instances overall.

In a fourth illustrative example, a model is retrained for each package associated with (e.g., delivered within, created within, etc.) a historic evaluation period. A new training period is determined for each package, wherein the model is trained on transit data associated with the training period. The training period for each package can be determined based on a reference time for said package (e.g., creation time, delivery time, other reference time, etc.) and the model's training window, or otherwise determined. If N packages were associated with the evaluation period, this example would generate N instances of the same model.

However, the model can be otherwise trained.

Determining package transit data S200 can function to determine actual transit times for one or more packages for model training, model evaluation, model selection and/or package transit prediction. The package transit data can be determined one or multiple times for: a time period (e.g., day, week, prediction period, evaluation period, training period, etc.), a model (e.g., based on the model specification), delivered and/or undelivered packages, and/or at any other suitable time. In a first example, transit data can be automatically determined for each new package in response to a successful delivery, stored in the data store, and subsequently accessed (e.g., for model training S150). In a second example, the transit data can be determined in response to a request (e.g., when a new prediction and/or evaluation period is selected, for a new set of packages, for a new carrier service selected, for a new shipping lane, etc.). However, the package transit data can be otherwise determined.

The package transit data can be determined for one or more packages. In a first variant, the packages are determined (e.g., selected, accessed, generated, etc.) based on shipment data associated with the packages (e.g., where the shipment data matches target shipment data). In a first embodiment, the packages are determined when the shipment data includes and/or is associated with a time period (e.g., a shipment creation date, delivery date, port departure date, etc.) that matches a given time period (e.g., evaluation period, training period, reference time period, prediction period, etc.). For example, packages can be selected when their respective delivery dates or creation dates are contained within an evaluation period. In a second embodiment, the shipment data includes a shipping carrier, carrier service, shipping lane, and/or other shipment information that matches comparable shipment data for a target package (e.g., a package undergoing transit data prediction). In a second variant, the packages are determined in response to a request (e.g., when a new shipment is created, the package associated with the shipment is selected). However, one or more packages can be otherwise determined.

Determining transit data for a package (e.g., a package in the set of determined packages) can include accessing transit data associated with the package. In a first variant, the determined transit data is tracking data (e.g., where the tracking data includes shipment transit time). In a second variant, the transit data is determined based on a calculated difference between a start date (e.g., shipment creation time period, the date the package arrived at and/or departed a shipping facility, etc.) and an end date (e.g., a delivery date, the date the package arrived at and/or departed a shipping facility, etc.). In a third variant, the determined transit data is predicted transit data.

However, transit data for one or more packages can be otherwise determined.

Evaluating the set of models S300 can function to compare predictions made by each model to actual transit data and/or perform a comparison between models. The set of models can be evaluated once or multiple times: each day, each week, each prediction period (e.g., where each prediction period is associated with an evaluation period), each evaluation period, for the set of models (e.g., evaluating the models after determining a set of models S100), for one or more delivered packages, and/or at any other suitable time. Models are preferably evaluated using the same evaluation period across all models (e.g., for a given comparison between models), but alternatively can be evaluated using different evaluation periods and/or without an evaluation period.

Figure 15:
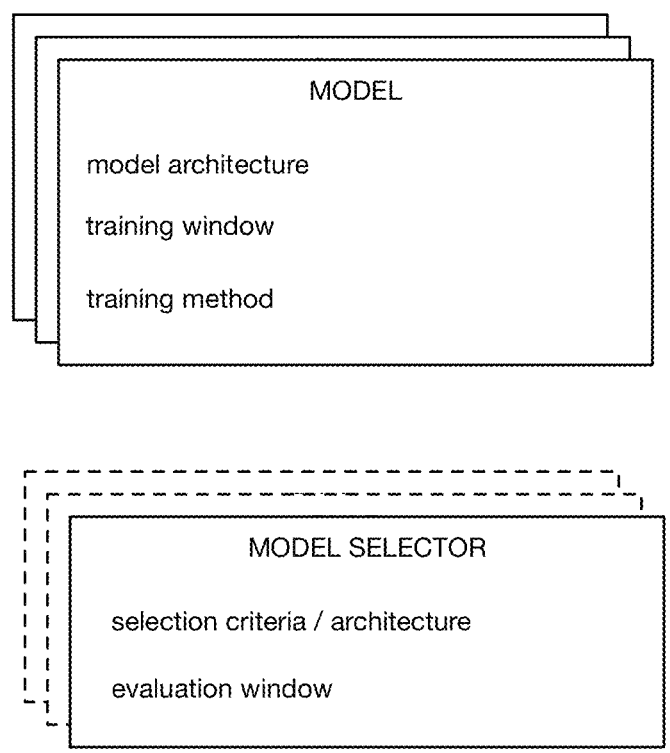
FIG. 15 depicts illustrative examples of model specifications and model selector specifications.

Evaluating the set of models S300 can optionally include determining an evaluation period S400. S400 can function to determine a time period for model evaluation, wherein packages selected during evaluation are associated with the time period. The evaluation period is preferably based on an evaluation window and a reference time, but can alternatively be otherwise determined. The evaluation window (e.g., including a duration of one or more time periods and/or an offset to the reference time period) can be:

specified by a model selector (e.g., specified by a rule; example shown in FIG. 15), predetermined, manually determined, determined based on a trained model, and/or otherwise determined. The evaluation period can be optionally segmented (e.g., by day, by any time period, based on transit data, etc.) into evaluation subperiods.

Figure 13:
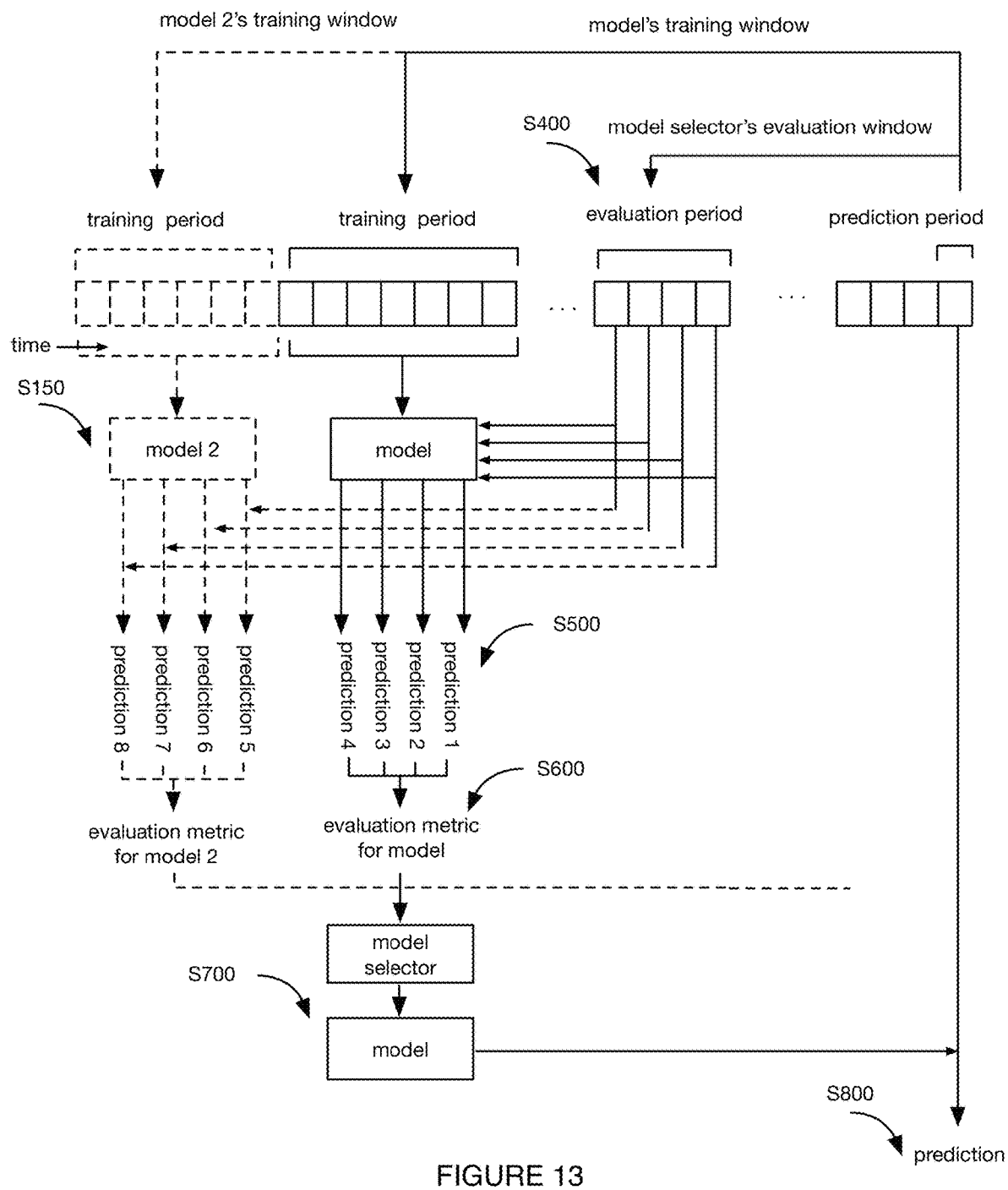
FIG. 13 depicts a variant of model training and use for a given prediction period.
Figure 14A:
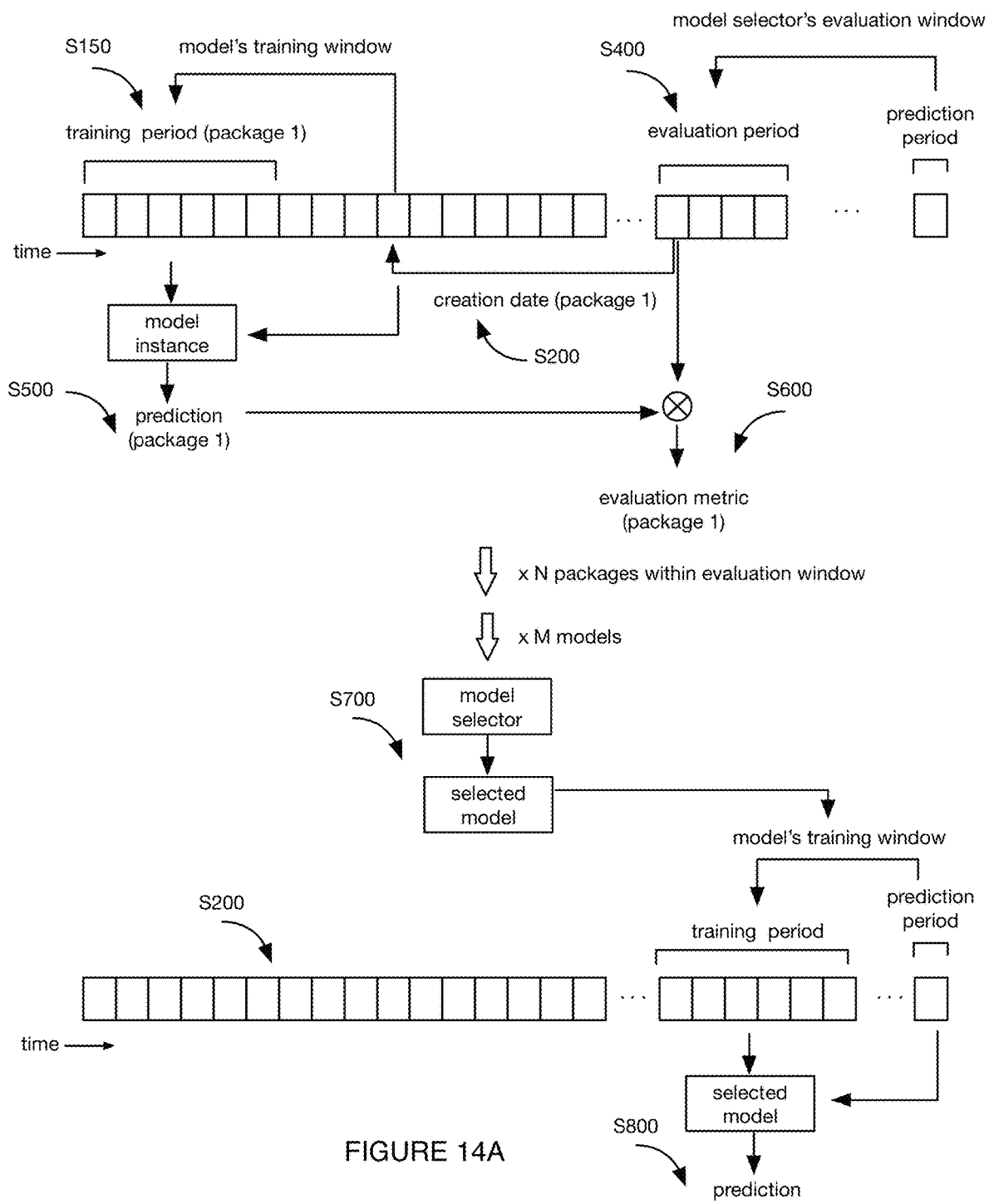
FIG. 14A depicts another variant of model training and use for a given prediction period.
Figure 14B:
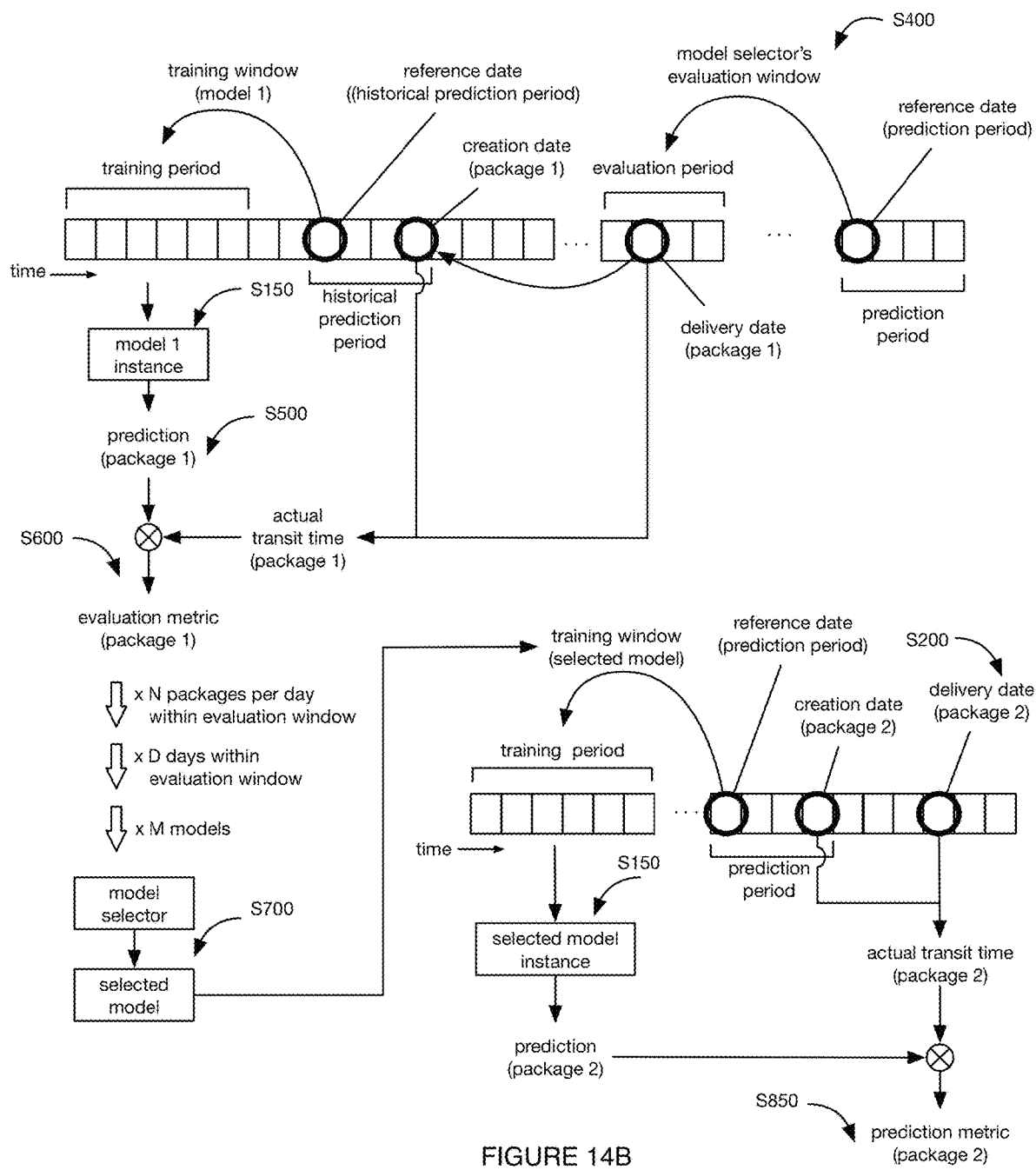
FIG. 14B depicts yet another variant of model training and use for a given prediction period.

In a first variant, the evaluation period is calculated from a model selector's evaluation window and a reference time, wherein the reference time can be based on a current date and/or a prediction period (e.g., the Monday of the current week, the first Sunday of the prediction period, the first day of the current month, etc.; examples shown in FIG. 13, FIG. 14A, and FIG. 14B). In an example, the evaluation period can be the five business days prior to the reference time and the week of the reference time period in the year prior to the reference time. In a second variant, the evaluation period is static (e.g., the evaluation period does not change as the current date and/or prediction period change). In a third variant, the evaluation period is a prediction period (e.g., when the prediction period is historical and/or when the prediction period will be historical when S600 is performed). In a fourth variant, the evaluation period is determined such that transit data for a threshold number of packages associated with the evaluation period is available (e.g., for improved statistical analysis). However, the evaluation period can be otherwise determined.

Alternatively, evaluating the set of models S300 does not include determining an evaluation period. In an example, a set of transit data for a set of evaluation packages is determined without specifying a time period associated with the evaluation packages (e.g., wherein the training data is determined based on the prediction period's reference time).

Evaluating the set of models S300 can optionally include determining a predicted transit time S500. S500 can function to predict transit times for the evaluation period (e.g., days in the evaluation period, packages in the evaluation period, etc.) using one or more models in the set of models. S500 can be performed during model evaluation, after an evaluation period has been determined, after transit data (e.g., shipment creation date) have been determined for a package, during inference, and/or at any other time.

In a first variant, the predicted transit time can be a statistical measure (e.g., mean, median, etc.) of a set of transit times. In a first example, the set of transit times is determined from training data in a training period determined based on the training window for the model (e.g., S150). In a second example, the set of transit times is determined from transit data for a set of packages (e.g., satisfying one or more shipment data criteria, associated with a time period, etc.).

Figure 10:
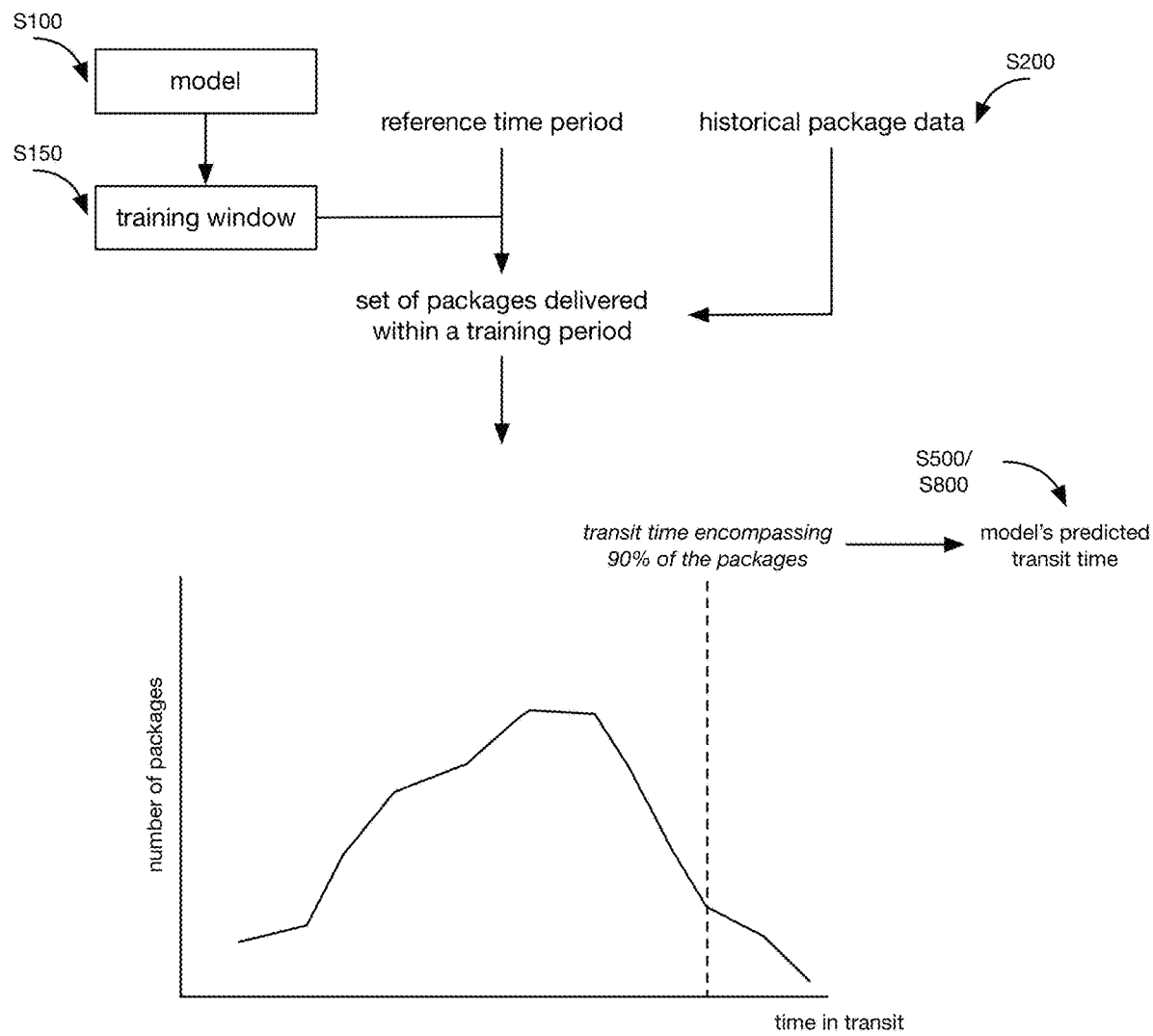
FIG. 10 depicts an illustrative example of determining a transit prediction.

In a second variant, the predicted transit time can be calculated based on a segmentation (e.g., by one or more percentiles: 50, 60, 70, 80, 90, 95, 99, etc.) of a set of actual transit times for a set of packages. In a specific example, if the percentile is 90%, the determined predicted transit time corresponds to a segment time where 10% of the set of packages had a transit time slower than the segment time (e.g., example shown in FIG. 10).

In a third variant, a model predicts a transit time for each shipment created, shipped, and/or delivered within a time period; the predicted transit times can then be aggregated to form a distribution of predicted transit times. In a first embodiment, this distribution can be segmented (e.g., by percentiles), wherein the model outputs a predicted transit time corresponding to a specified segment (e.g., percentile). In a second embodiment, a statistical measure (e.g., mean, median, mode, variance, etc.) can be determined for the distribution, wherein the model can output the statistical measure.

In a fourth variant, the model is a machine learning model (e.g., trained via S150) which outputs a transit prediction for a package (and/or group of packages) based on shipment data associated with the package(s). In an example, the transit data can include a shipment creation date and/or shipping parameters.

The predicted transit time can be determined using any method in S800.

However, the predicted transit time can be otherwise determined.

Evaluating the set of models S300 can optionally include determining an evaluation metric S600. S600 can function to provide a standardized metric to enable a direct comparison between models and/or to evaluate one or more predicted transit times. An evaluation metric can be determined for a package, for a time period (e.g., evaluation period, evaluation subperiod, etc.), for a model, and/or for any other suitable shared parameter. The evaluation metric can be determined for a single predicted transit time and/or aggregated across multiple predicted transit times (e.g., predictions for all or a plurality of packages during an evaluation period, predictions determined by a model, etc.). An evaluation metric can be a prediction metric (e.g., S850), or be another metric. In an example, an evaluation metric can describe the accuracy of a single prediction, while a prediction metric can describe the accuracy of a model's predictions (e.g., overall). In another example, evaluation metrics and prediction metrics can be interchangeable. However, the evaluation metric can be otherwise defined.

Figure 7:
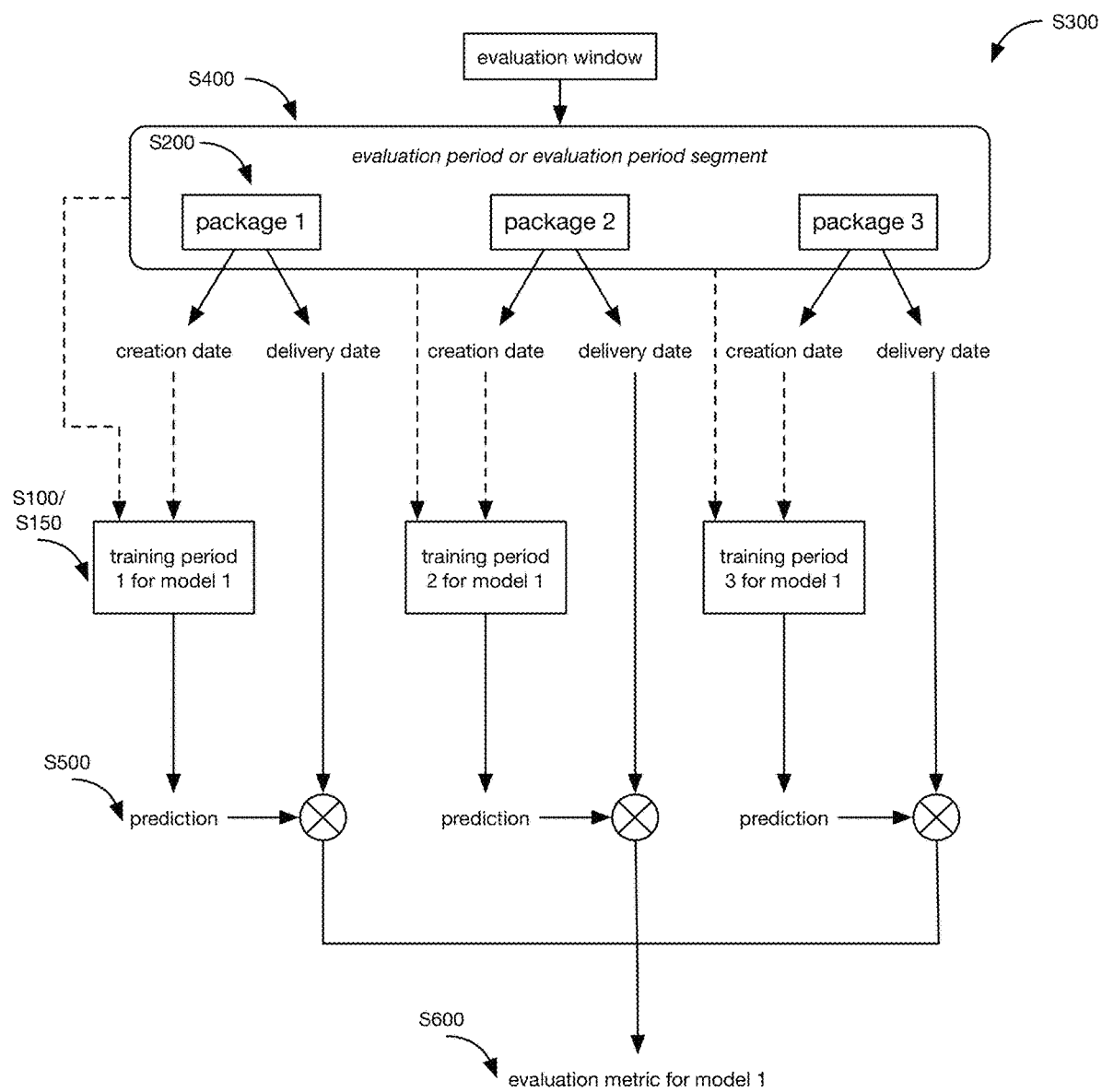
FIG. 7 depicts an embodiment of the method, including determining an evaluation metric for an evaluation period.

In a first variant, the evaluation metric can be determined based on a comparison between a predicted and an actual transit time (e.g., where the actual transit time can be determined based on a duration between a shipment creation date and delivery date). An example is shown in FIG. 7.

In a first embodiment of the first variant, the evaluation metric is determined based on a comparison between a predicted and an actual transit time for each package in the evaluation period (e.g., subperiod). In a first example, the evaluation metric is determined based on the percent of packages in the evaluation period that were faster or slower than their corresponding predicted transit time. In a specific example, the percentage is compared to a predicted percentage (e.g., based on a percentile used in S800, based on a shipping carrier service, based on a shipping lane, etc.). In an illustrative example, if a shipping lane and/or carrier service specifies a delivery duration (e.g., second-day air), the model can predict a percentage of packages that will be delivered after the specified duration; this prediction can then be compared to the actual percentage of packages delivered late. In a second example, the evaluation metric is determined based on a number of packages that were slower than predicted (e.g., the associated actual transit time was greater than the corresponding predicted transit time). In a third example, the evaluation metric is determined based on a total time (e.g., number of days, number of business days, etc.) the packages (e.g., in aggregate) spent in transit longer than predicted. In an illustrative example, for a set of two packages, if one package was in transit 2 days slower than predicted and one package was in transit 1 day faster than predicted, the total time could be 1 day (e.g., where the 1 day faster is subtracted from the slow days) or 2 days (e.g., only based on the time slower than predicted). In a fourth example, the evaluation metric is determined based on the difference between the predicted and actual transit times for each package (e.g., an absolute value of difference, a regression, any error algorithm, etc.). In a fifth example, statistical methods (e.g., standard deviation, outlier analysis, etc.) can be used to generate the evaluation metric as a comparison between the predicted transit times to the actual transit times (e.g., a number and/or percent of outlier predictions). In a sixth example, clustering algorithms can be used to generate the evaluation metric. In a seventh example, the evaluation metric is determined based on the ratio between the predicted and actual transit times for each package.

In a second embodiment of the first variant, the evaluation metric is determined based on a comparison between an aggregated predicted transit time (e.g., average, weighted average, median, etc.) across packages in the evaluation period to an aggregated actual transit time across the same package set.

In a second variant, the evaluation metric can be determined based on the predicted transit time (e.g., not based on an actual transit time). In an example, the evaluation metric can be the predicted transit time. This variant can function to compare predictions across models (e.g., a model can be selected in S700 with the shortest prediction, longest prediction, median prediction, etc.).

However, the evaluation metrics can be otherwise determined.

However, the models can be otherwise evaluated.

Figure 12:
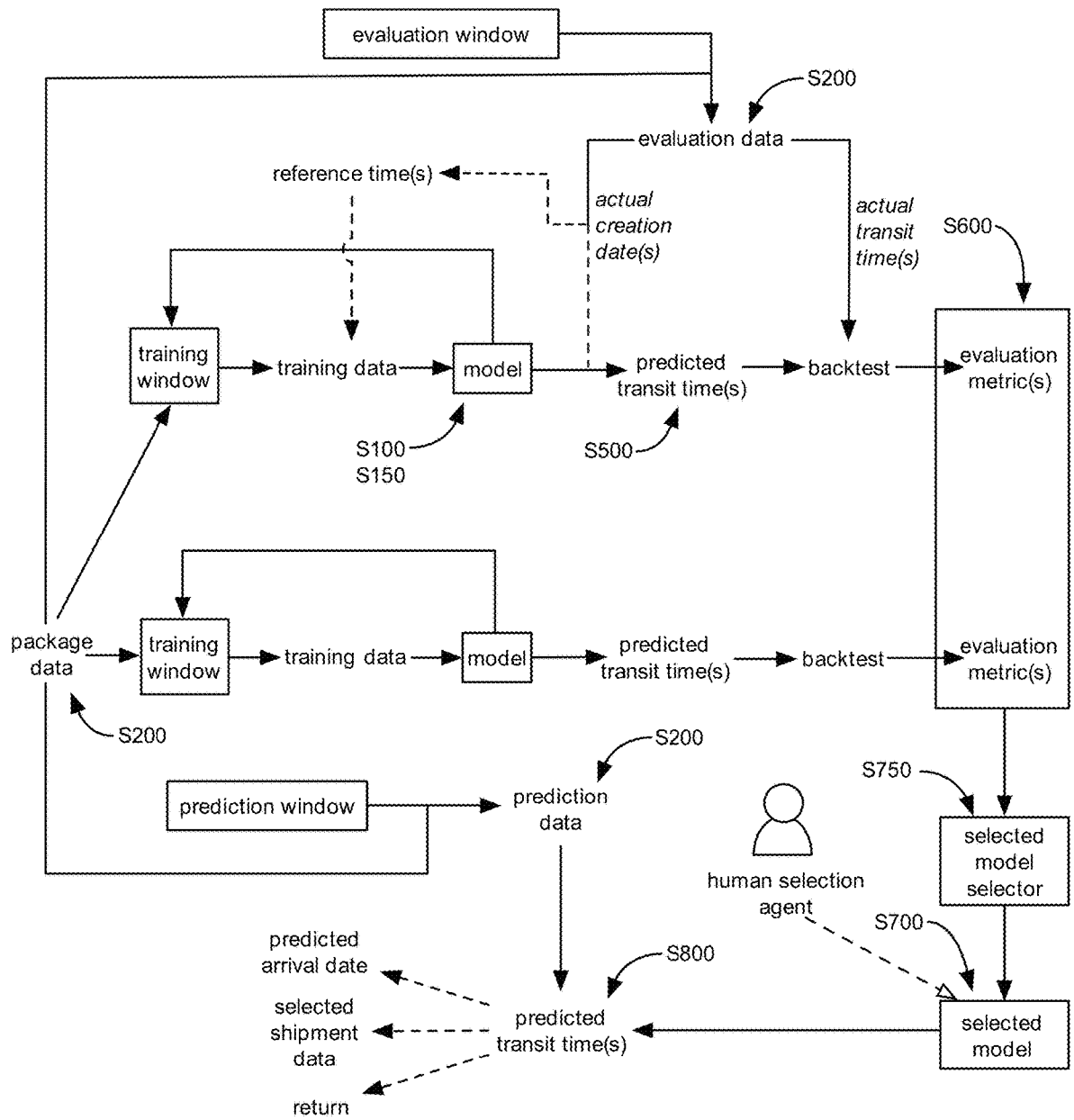
FIG. 12 depicts an embodiment of the method, including selecting a model.

Selecting a model from the set of models S700 can function to select a model to predict transit data (e.g., for one or more packages associated with a prediction period). A model can be selected after S300, before and/or at the start of a prediction period, during S750 (e.g., where each rule results in one or more model selections), in response to a user (e.g., a human selection agent) input, and/or at any other time. A human selection agent can verify, override, select, and/or otherwise determine the model (e.g., example shown in FIG. 12). The set of models is preferably determined in S100, but alternatively can be otherwise determined.

Figure 8:
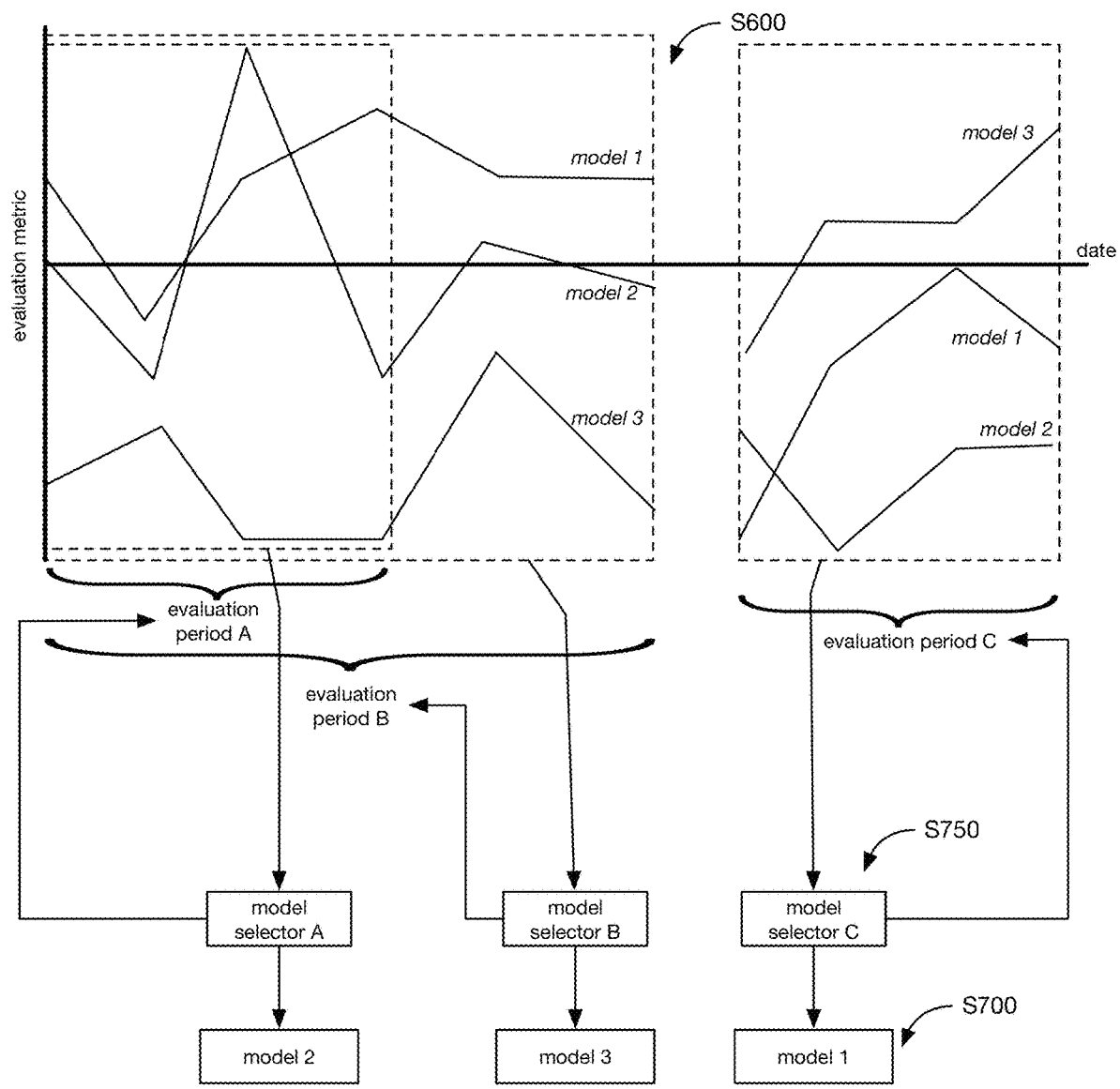
FIG. 8 depicts an illustrative example of model selection.

In a first variant, the model can be selected based on one or more evaluation metrics (e.g., determined in S600). In a first embodiment, the model is selected based on a model selector (e.g., wherein the model selector is a rule; example shown in FIG. 8). In this embodiment, the model selector can be manually determined, determined in S750, or otherwise determined. In a second embodiment, the model is selected based on its predicted transit time and/or aggregate predicted transit time for the evaluation period relative to the other model(s) predicted transit time(s). For example, the selected model's prediction is the slowest, fastest, average, median, and/or is selected based on any other suitable population comparison. This embodiment can be used when the evaluation metric is not based on actual transit time(s), or otherwise used. In a third embodiment, the model is selected using a decision tree. In a fourth embodiment, the model is selected using heuristics.

In a second variant, the model can be selected based on transit data (e.g., where the selected model was trained using training data associated with that transit data). In a first embodiment, the transit data includes shipment data, wherein the selected model is associated with the shipment data associated with that package (e.g., shipping carrier service). In a second embodiment, the transit data comprises one or more time periods, wherein the selected model was trained using training data associated with the time periods (e.g., a time period of the year, day of the week, holiday season, etc.). For example, for a prediction period of December 2021, the selected model can be a model trained on data from a previous December.

In a third variant, a machine learning selection model can be trained to select the model from a set of models (e.g., wherein the model selector is a machine learning model). In an example, each model in the set of models outputs transit data prediction(s) and/or an aggregate prediction for an evaluation period (e.g., for each package in the evaluation period). The selection model can then output a model selection based on the predictions. The machine learning selection model can optionally be trained on a comparison between the selected model's predictions and actual transit data (e.g., to select models that minimize the difference between the predicted and actual transit data).

However, the model can be otherwise selected.

The method can optionally include determining a model selector for model selection S750. S750 can function to determine a model selection process and/or criteria based on one or more evaluation metrics. The model selector used to select a model (e.g., for a prediction period) can be determined prior to S700, during S700, prior to S100, each iteration of the method (e.g., where the selection from each model selector is continually tracked and used as feedback to select future model selectors), and/or at any other time. Model selector selection can be performed once (e.g., a model selection rule is selected for universal use), performed for each prediction period, performed when the model accuracies all fall below a threshold, be iteratively performed, and/or be performed at any other suitable time. The model selector can be determined automatically, manually (e.g., via the selection interface), based on a model selector generation model, selected from a set of model selectors, be predetermined, and/or be otherwise determined.

Figure 9:
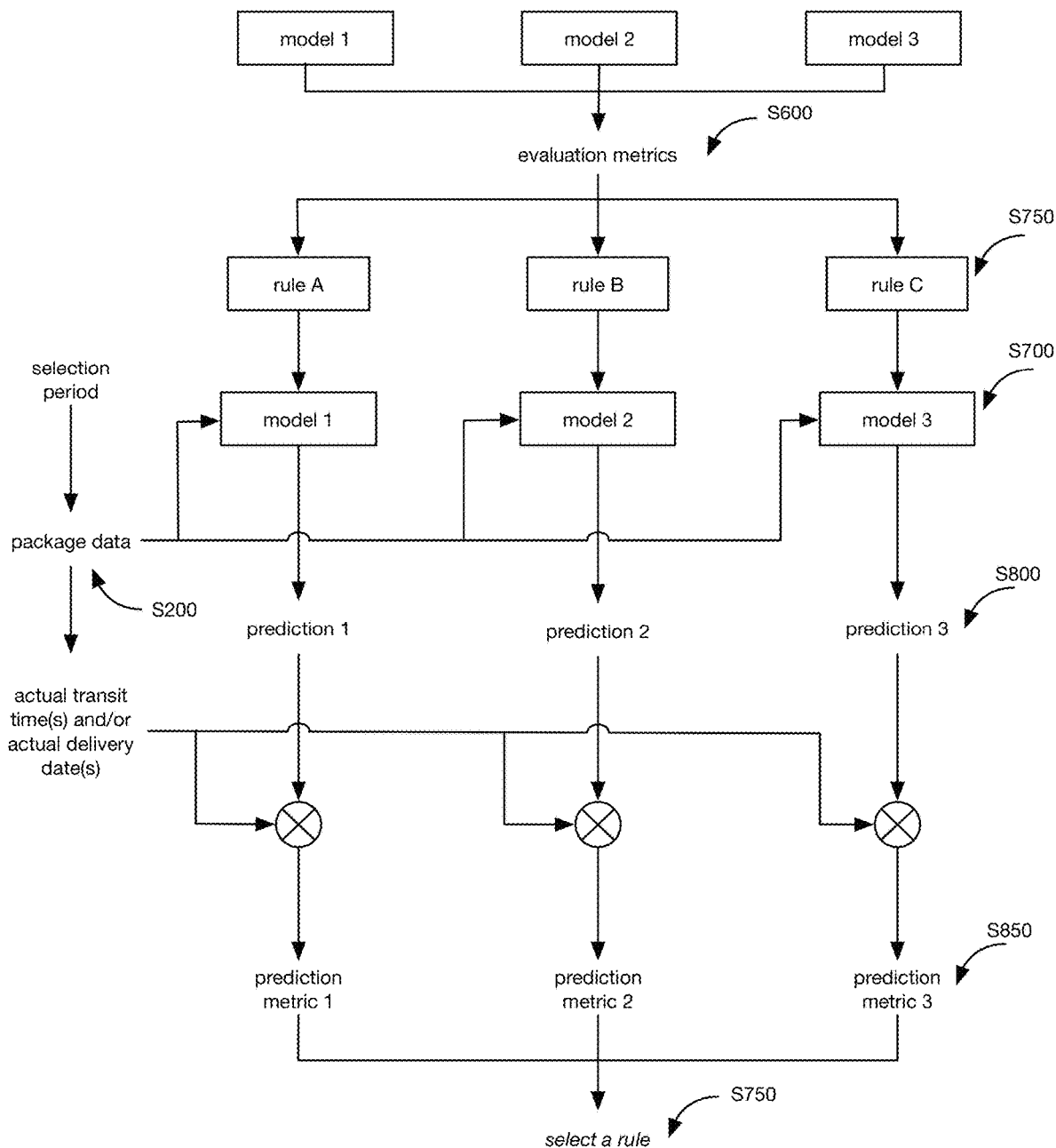
FIG. 9 depicts an embodiment of the method, including selecting a rule.

S750 can include: determining an evaluation period for each model selector of the set; performing S300 using the evaluation period in lieu of the prediction period; selecting the model based on the evaluation using the model selector (e.g., repeating S700); determining a prediction metric (e.g., S850) based on the selected model; optionally repeating the above for multiple evaluation periods; and selecting the model selector from the model selector set based on the prediction metrics. The evaluation period is preferably determined from the model selector's evaluation window and a selection period or reference time thereof (e.g., wherein the selection period is the same for all model selectors), but can alternatively be predetermined or be otherwise determined. The prediction metric is preferably calculated for the selection period (e.g., calculated from the actual delivery times vs. the delivery times predicted by the model selector-selected model for packages within the selection period), but can alternatively be calculated across multiple selection periods or for any other suitable time period. The selection period for calculating prediction metrics is preferably the same for all model selectors in the set of model selectors (e.g., to enable a standardized comparison between model selectors), but alternatively can be different. The selected model selector is preferably the most accurate model selector (e.g., selects models that have the smallest actual vs. predicted difference), but can alternatively be the most precise model selector, the fastest model selector, and/or be selected based on any other suitable basis. An example is shown in FIG. 9.

In a first embodiment, prediction metrics associated with each model selector can be tracked over multiple iterations of model selection and transit time prediction (e.g., over multiple prediction periods). These tracked prediction metrics can then be used to select one or more model selectors (e.g., for a new prediction period). In a first example, a single rule is selected as the model selector for use across future prediction periods. In a second example, a model (e.g., any algorithm, a machine learning model, etc.) can be determined and/or trained to select a rule for a given prediction period (e.g., based on package transit data for packages in the prediction period, based on the prediction period, based on contextual parameters, based on the time of year, etc.).

In a second embodiment, for a prior prediction period, the set of model selectors can be evaluated based on prediction metric(s) associated with each model selector (e.g., based on predictions made using each selected model, one model per model selector, for the prior prediction period). Based on this evaluation, one model selector from the set can be selected for use in a subsequent prediction period (e.g., immediately after the prior prediction period, non-consecutive with the prior prediction period, etc.).

In a third embodiment, model selector evaluation and selection can be simultaneously performed with on-line implementation of the method. In an example, though a single model selector may be selected for a given prediction period (e.g., for on-line implementation of model selection), all model selectors in the set can be additionally implemented (e.g., in parallel) for evaluation. The single selected model selector can be updated and/or replaced based on feedback from the prediction metrics associated with each model selector (e.g., where the feedback may be delayed for prediction metric calculations based on actual package arrival dates).

However, the model selector can be otherwise determined.

Predicting package transit data S800 can function to predict a transit time for one or more packages using the selected model. A transit time can be predicted after S700, iteratively for each package in a prediction period, during S750, during S500, during S150, during inference, and/or any other suitable time. The package can be delivered (e.g., for a package in a historical training period, historical evaluation period, etc.) or undelivered (e.g., for a package in a current prediction period, future prediction period, etc.).

The package is preferably associated with a time period (e.g., prediction period), but can alternatively have no association with a time period. The time period is preferably based on a time window (e.g., a prediction period is based on a prediction window) and a reference time period, but alternatively can be otherwise determined.

In a first variant, the reference time period can be based on a current date and/or evaluation period (e.g., midnight on Monday of the current week, the first Sunday of the prediction period, the first day of the current month, etc.). In an example, a new prediction period can begin at midnight of the current and/or upcoming week. In a second variant, the prediction period is static. In a third variant, the prediction period is determined such that transit data for a threshold number of packages associated with the prediction period is available (e.g., for improved statistical analysis). However, the prediction period can be otherwise determined.

Preferably, a predicted transit time is determined for each model (e.g., in a set of models) and/or for each package (e.g., in a set of packages associated with a time period). Alternatively, a predicted transit time can be determined for a group of packages (e.g., in aggregate; a predicted transit time can apply to all packages in a prediction period; etc.), for a subset of the set of models, for a subset of packages (e.g., satisfying a set of shipment data criteria), and/or otherwise determined. In one embodiment, each model in the set of models can be previously trained (e.g., prior to S500, during model evaluation, during S100, and/or any other time). In a second embodiment, each model can be retrained and/or determined for the package undergoing the transit prediction.

The package transit can be predicted using any method in S500 or otherwise determined.

However, package transit data can be otherwise predicted.

In variants, the predicted transit time can be returned to a user (e.g., in response to a request, in response to a shipment creation event, via the API, etc.), used to select a shipping carrier and/or carrier service (e.g., based on the shipping carrier and/or carrier service with the minimum predicted transit time), used to predict and/or adjust pricing for a shipment, used to calculate an estimated arrival date (e.g., based on a the shipment creation date), and/or used for any other method and/or system. In variants, a shipping label can be generated (e.g., automatically, manually, etc.) based on the selected shipping carrier and/or carrier service, and the package can be shipped (e.g., automatically, manually) using the shipping label.

The method can optionally include determining a prediction metric S850. Determining a prediction metric can function to evaluate a model selector's performance (e.g., for model selector evaluation and/or selection). A prediction metric can be determined during S750, after a prediction period expires (e.g., to evaluate predictions made for packages in that prediction period), after a package has been delivered (e.g., where the prediction metric can act as feedback for model training), and/or at any other time. The prediction metric can be determined for a single predicted transit time and/or aggregated across multiple predicted transit times (e.g., predictions for all or a plurality of packages during a prediction period, predictions determined by a model selected based on a given rule, etc.).

Figure 11:
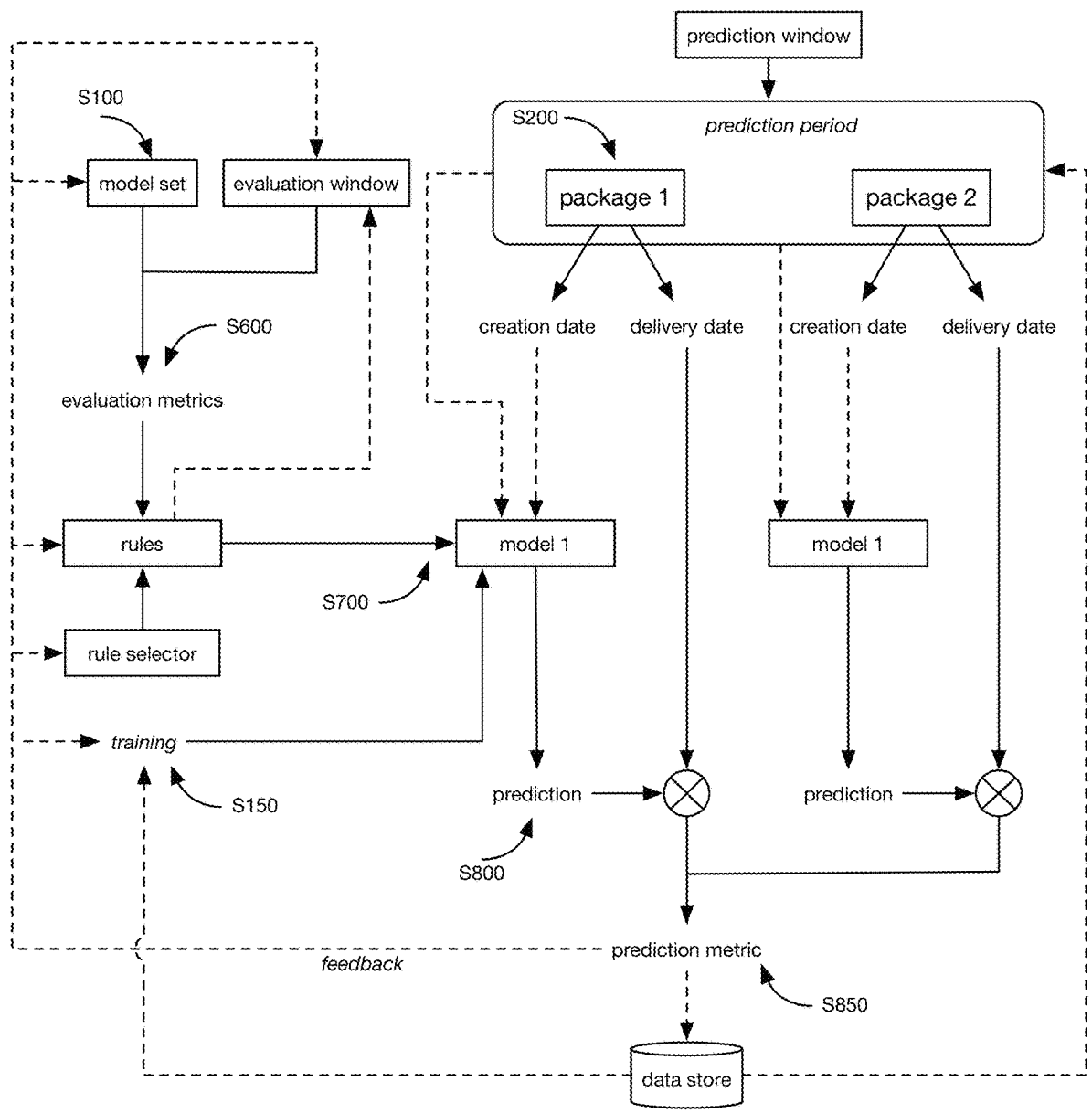
FIG. 11 depicts an embodiment of the method, including determining a prediction metric for a prediction period.

In a first variant, the prediction metric can be determined based on a comparison between a predicted transit time and an actual transit time. For example, for each package associated with (e.g., created within) a prediction period, a model can be used to predict an estimated transit time; the prediction metric can then be a comparison between the predicted and actual transit times and/or an aggregated comparison across a plurality of packages in the prediction period (e.g., where the prediction period is historical; where the prediction period was not historical when the predictions were made, but was historical when actual transit times were determined, etc.). The comparison can be a difference, a ratio, a performance metric (e.g., precision, accuracy, recall, etc.), a statistical measure, and/or any other metric. Each model (e.g., where one model is selected by each model selector in a set) can be associated with one or more prediction metrics (e.g., the comparison for each package, aggregated comparisons across packages, etc.). An example is shown in FIG. 11.

Additionally or alternatively, the prediction metric can be determined using any evaluation metric determination method (e.g., in S600). However, the prediction metric can be otherwise determined.

The method can optionally include repeating all or part of S100-S800 for a successive prediction period S900. S900 can function to select an updated model for a successive prediction period (e.g., wherein the updated model is better suited for package predictions in the successive prediction period than the model first selected in S700). Optionally, S900 can additionally or alternatively function to retrain one or more models for a successive prediction period.

The successive period can start immediately after a prior prediction period, can overlap with a prior prediction period, start the next business day after a prior prediction period, have no relation to the prior prediction period, and/or be otherwise configured relative to any other prediction period. The successive period can be predetermined (e.g., each prediction period is 1 day, 1 week, 1 month, 5 business days, etc.), determined manually, determined automatically (e.g., when a prior prediction period expires or nears expiring), determined using a model, and/or be otherwise determined. In a first variant, each prediction period is predetermined (e.g., in a set series of prediction periods) and repeating all or part of S100-S800 for a successive prediction period is triggered by the current date (e.g., including time) nearing the end of the previous prediction period, the current date advancing beyond the previous prediction period, the current date meeting a reference time period relative to the successive prediction period (e.g., Monday at midnight prior to the successive prediction period, etc.), the current date entering and/or nearing the successive prediction period, etc. In a second variant, the prediction period model can determine when a previous model's predictions are underperforming (e.g., when prediction metric(s) are below a threshold, model evaluation metric(s) are below a threshold, model selector selects a different model, etc.). The prediction period model can then trigger the determination of a new prediction period (e.g., where a new model is selected and/or one or more models are retrained for the new prediction period). In a third variant, the prediction period model repeats all or a portion of S100-S800 (e.g., continually, iteratively, based on a request, each day, each week, etc.). When a proposed new model outperforms (e.g., by a statistically significant margin, by a given threshold, etc.) the previously selected model (e.g., during reselection S700), a new, successive prediction period can be selected and/or one or more models can be newly selected, retrained, and/or updated. In a fourth variant, the prediction period model can trigger the determination of a new prediction period based on a change (e.g., beyond a threshold) in transit data for one or more packages (e.g., between packages in a recent time period compared to packages in the prior and/or current prediction period). Examples of transit data changes can include: an increased probability of rain, shipment creation date changing from a weekday to a weekend or vice versa, shipment creation date enters a time period prior to a holiday season, and/or any other transit data change.

When repeating all or portion of S100-S800, the set of models (e.g., determined in S100) can be the same as used a previous iteration of all or a portion of S100-S800 and/or be different. In either case, the models can be trained on the same and/or new sets of training data. In an example, the reference time used to define training windows for one or more models can be adjusted based on: a reference time for the successive prediction period, the duration between the successive prediction and the previous prediction period, a reference time for a successive evaluation period, a difference between evaluation periods, and/or otherwise updated.

When repeating all or portion of S100-S800, the evaluation period (e.g., determined in S400) can be the same as in a previous iteration of all or a portion of S100-S800 and/or be different. In a first variant, the evaluation period can be determined based on a new reference time (e.g., the current date, the successive prediction period, a reference time associated with the successive prediction period, etc.). In a second variant, the evaluation period can be incremented by the same duration as the difference between the previous prediction period and the successive prediction period (e.g., the reference time for the evaluation window is incremented by the same amount as the reference time period for the prediction window was incremented between the previous prediction period and the successive prediction period). However, the evaluation period can be otherwise determined.

However, all or part of S100-S800 can be otherwise repeated.

Alternative embodiments implement the above methods and/or processing modules in non-transitory computer-readable media, storing computer-readable instructions, that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

I claim:

1. A method, comprising:
a. training a set of models using supervised learning, wherein each model is associated with a sliding training window, and wherein each model is trained on a different set of historic transit data selected based on the respective sliding training window;
b. determining an actual transit time for each package in a set of packages delivered within an evaluation period;
c. for each model in the set of models:
determining a predicted transit time for each package in the set of packages using the trained model;
determining individual evaluation metrics for each day of an evaluation period based on the respective predicted transit time and actual transit time for the set of packages; and
determining an overall evaluation metric by aggregating the respective individual evaluation metrics;
d. selecting a model from the set of models based on the respective overall evaluation metric for each of the set of models; and e. using the selected model, predicting a future transit time for a target package, wherein the target package is associated with a shipment created within a prediction period.

2. The method of claim 1, further comprising repeating a)-e) for a successive prediction period.

3. The method of claim 1, wherein the evaluation period is redetermined for the prediction period.

4. The method of claim 1, wherein the sliding training window comprises a set of dates relative to a date associated with a package, wherein at least two packages in the set of packages are associated with different dates, and the sliding training window encompasses a first set of dates for the first package and slides to encompass a second set of dates for the second package.

5. The method of claim 4, wherein the date associated with a package is based on the respective shipment creation date.

6. The method of claim 4, wherein the set of dates comprises nonconsecutive dates.

7. The method of claim 1, wherein determining the predicted transit time comprises determining a minimum transit time for a predetermined percentile of packages in the historic transit data to be delivered.

8. The method of claim 1, further comprising:
receiving, from a client computing system, a shipment request for the target package;
generating a response to the shipment request, wherein the response comprises the future transit time for delivering the target package; and
providing the response to the client computing system.

9. The method of claim 1, wherein the historic transit data is associated with at least one of: a shipping carrier, a shipping carrier service, or a shipping lane.

10. The method of claim 1, wherein the historic transit data comprises bi-directional transit times.

11. The method of claim 1, wherein predicting the future transit time for the target package comprises:
determining a set of historic transit data based on the sliding training window, associated with the selected model, that is determined based on a date associated with the target package; and
retraining the selected model on the set of historic transit data, wherein the future transit time is predicted using the retrained model.

12. A method, comprising:
a. training a set of models, wherein each model is a machine learning model trained on a different set of historic transit data;
b. determining actual transit times for a set of packages;
c. for each model:
predicting a transit time for each package in the set of packages with the trained model;
determining individual evaluation metrics for each day of an evaluation period based on the predicted and actual transit times for the set of packages; and
determining an overall evaluation metric by aggregating the individual evaluation metrics;
d. selecting a model from the set of models based on the respective overall evaluation metric for each of the set of models;
e. using the selected model, predicting a new transit time for a package, wherein the package is associated with a shipment created within a prediction period; and
f. repeating a)-e) for a successive prediction period, wherein the set of models are retrained for the successive prediction period.

13. The method of claim 12, wherein the different set of historic transit data for each model is determined based on a sliding training window associated with the model, wherein the sliding training window slides with a reference date.

14. The method of claim 13, wherein the reference date is based on the prediction period.

15. The method of claim 12, wherein the set of packages are delivered within the evaluation period.

16. The method of claim 15, wherein d) is performed using a selection rule, wherein the evaluation period is associated with the selection rule.

17. The method of claim 16, further comprising selecting the selection rule from a set of rules, wherein selecting the selection rule comprises:
for each rule of the set, selecting a model from the set of models based on the rule, wherein e) is performed using each selected model;
determining a prediction metric for each rule based on the new transit times predicted by the model selected by the respective rule; and
selecting the selection rule from the set of rules based on the respective prediction metrics.

18. The method of claim 12, wherein selecting the model is further based on a user input.

* * * * *